United States Patent
Lim et al.

(10) Patent No.: US 10,984,466 B2
(45) Date of Patent: Apr. 20, 2021

(54) USER TERMINAL DEVICE FOR PROVIDING ELECTRONIC SHOPPING SERVICE AND METHODS THEREOF

(71) Applicant: SAMSUNG ELECTRONICS CO., LTD., Suwon-si (KR)

(72) Inventors: Eun-young Lim, Seoul (KR); Hyun-young Kim, Suwon-si (KR); Yeon-hee Roh, Seoul (KR); Joo-kyung Woo, Seoul (KR); Young-shil Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/399,196

(22) Filed: Apr. 30, 2019

(65) Prior Publication Data
US 2019/0259089 A1   Aug. 22, 2019

Related U.S. Application Data

(63) Continuation of application No. 13/915,091, filed on Jun. 11, 2013, now Pat. No. 10,311,503.

(30) Foreign Application Priority Data

Jan. 7, 2013  (KR) .................. 10-2013-0001797

(51) Int. Cl.
*G06Q 30/00*      (2012.01)
*G06Q 30/06*      (2012.01)
(Continued)

(52) U.S. Cl.
CPC ....... *G06Q 30/0641* (2013.01); *G06F 3/0482* (2013.01); *G06F 16/583* (2019.01);
(Continued)

(58) Field of Classification Search
None
See application file for complete search history.

(56) References Cited

U.S. PATENT DOCUMENTS 5,483,472 A * 1/1996 Overman ............. G06F 15/025
                                                     705/28
5,821,513 A * 10/1998 O'Hagan ............. B62B 3/1416
                                                     235/383
(Continued)

FOREIGN PATENT DOCUMENTS

CN    1354864 A    6/2002
CN    1797270 A    7/2006
(Continued)

OTHER PUBLICATIONS

Communication dated Oct. 23, 2014 issued by United States Patent Office in counterpart U.S. Appl. No. 13/915,173.
(Continued)

*Primary Examiner* — Gurkanwaljit Singh
(74) *Attorney, Agent, or Firm* — Sughrue Mion, PLLC

(57) ABSTRACT

A user terminal device includes a display, a sensor, and a controller configured to control the display to display a screen comprising information on a product, and, based on a user input for defining a closed area by drawing a curve around the information on the product being sensed through the sensor, obtain price information of the product from at least one object included in the defined closed area, and add the obtained price information to a wish list.

9 Claims, 41 Drawing Sheets

Related U.S. Application Data

(60) Provisional application No. 61/658,156, filed on Jun. 11, 2012.

(51) Int. Cl.
*G06F 3/0482* (2013.01)
*G06F 16/583* (2019.01)

(52) U.S. Cl.
CPC ..... *G06Q 30/0603* (2013.01); *G06Q 30/0643* (2013.01); *G06F 2203/04803* (2013.01)

(56) References Cited

U.S. PATENT DOCUMENTS

| | | | |
|---|---|---|---|
| 6,000,610 A * | 12/1999 | Talbott | B42D 15/00 186/52 |
| 6,421,453 B1 | 7/2002 | Kanevsky et al. | |
| 7,023,979 B1 * | 4/2006 | Wu | H04M 3/5233 379/265.11 |
| 7,181,621 B2 | 2/2007 | Labaton | |
| 7,593,000 B1 | 9/2009 | Chin | |
| 7,970,650 B2 | 6/2011 | Tokorotani | |
| 8,369,887 B2 | 2/2013 | Choe et al. | |
| 8,627,379 B2 * | 1/2014 | Kokenos | G06Q 30/02 725/60 |
| 8,745,490 B2 | 6/2014 | Kim | |
| 8,773,376 B2 | 7/2014 | Batara | |
| 8,799,897 B2 * | 8/2014 | Katiyar | G06F 9/45533 718/1 |
| 8,810,367 B2 | 8/2014 | Mullins | |
| 8,856,039 B1 * | 10/2014 | Talreja | G06F 16/972 705/27.1 |
| 9,317,835 B2 * | 4/2016 | Calman | G06Q 30/02 |
| 9,483,758 B2 | 11/2016 | Rhee et al. | |
| 9,575,615 B1 * | 2/2017 | Nicholls | G06F 3/0346 |
| 9,589,296 B1 * | 3/2017 | Li | G06Q 30/0641 |
| 9,665,837 B2 * | 5/2017 | Garrison | G06Q 20/20 |
| 9,826,077 B2 | 11/2017 | Shim et al. | |
| 10,002,337 B2 * | 6/2018 | Siddique | H04W 4/00 |
| 2002/0161717 A1 * | 10/2002 | Kassan | G06Q 20/1085 705/59 |
| 2003/0004831 A1 | 1/2003 | Owens | |
| 2003/0051138 A1 | 3/2003 | Maeda et al. | |
| 2003/0158796 A1 * | 8/2003 | Balent | G06Q 10/087 705/28 |
| 2004/0148226 A1 | 7/2004 | Shanahan | |
| 2005/0033704 A1 | 2/2005 | Kirk | |
| 2005/0060554 A1 | 3/2005 | O'Donoghue | |
| 2005/0203765 A1 | 9/2005 | Maritzen et al. | |
| 2005/0270140 A1 | 12/2005 | Oh | |
| 2006/0139336 A1 | 6/2006 | Mattingley-Scott et al. | |
| 2006/0215753 A1 * | 9/2006 | Lee | H04N 7/147 375/240.08 |
| 2007/0150369 A1 * | 6/2007 | Zivin | G06Q 30/0631 705/26.64 |
| 2007/0177804 A1 | 8/2007 | Elias et al. | |
| 2008/0092245 A1 | 4/2008 | Alward et al. | |
| 2008/0167977 A1 * | 7/2008 | Auvenshine | G06F 9/5061 705/34 |
| 2008/0228600 A1 | 9/2008 | Treyz et al. | |
| 2008/0320107 A1 * | 12/2008 | Park | H04L 67/04 709/219 |
| 2009/0085877 A1 | 4/2009 | Chang et al. | |
| 2009/0192913 A1 | 7/2009 | Saito et al. | |
| 2009/0299834 A1 * | 12/2009 | Wilson | G06Q 30/0207 705/14.1 |
| 2009/0313101 A1 | 12/2009 | McKenna et al. | |
| 2010/0004033 A1 | 1/2010 | Choe et al. | |
| 2010/0036698 A1 * | 2/2010 | Garrison | G06Q 10/06 705/16 |
| 2010/0125495 A1 | 5/2010 | Smith et al. | |
| 2010/0184413 A1 | 7/2010 | Jo et al. | |
| 2010/0191578 A1 | 7/2010 | Tran et al. | |
| 2010/0222036 A1 | 9/2010 | Wormald et al. | |
| 2010/0257447 A1 | 10/2010 | Kim et al. | |
| 2010/0265204 A1 | 10/2010 | Tsuda | |
| 2010/0280918 A1 | 11/2010 | Balent | |
| 2010/0306718 A1 | 12/2010 | Shim et al. | |
| 2011/0016150 A1 * | 1/2011 | Engstrom | G06F 16/58 707/778 |
| 2011/0077997 A1 * | 3/2011 | Agarwala | G06Q 30/04 705/7.35 |
| 2011/0078695 A1 * | 3/2011 | Agarwala | G06Q 10/06 718/104 |
| 2011/0082735 A1 * | 4/2011 | Kannan | G06Q 30/0222 705/14.23 |
| 2011/0106581 A1 | 5/2011 | Rohrbasser et al. | |
| 2011/0130170 A1 | 6/2011 | Han et al. | |
| 2011/0145051 A1 | 6/2011 | Paradise et al. | |
| 2011/0151901 A1 | 6/2011 | Choi et al. | |
| 2011/0196724 A1 * | 8/2011 | Fenton | G06Q 50/01 705/14.16 |
| 2011/0218845 A1 * | 9/2011 | Medina | G06Q 30/0208 705/14.11 |
| 2011/0251954 A1 | 10/2011 | Chin | |
| 2011/0261000 A1 | 10/2011 | Batara | |
| 2011/0282785 A1 | 11/2011 | Chin | |
| 2012/0062688 A1 | 3/2012 | Shen et al. | |
| 2012/0077470 A1 | 3/2012 | Kim et al. | |
| 2012/0078682 A1 | 3/2012 | Pinsley et al. | |
| 2012/0102145 A1 | 4/2012 | Jung et al. | |
| 2012/0127179 A1 | 5/2012 | Aspelin | |
| 2012/0150598 A1 * | 6/2012 | Griggs | G06Q 30/0214 705/14.16 |
| 2012/0196573 A1 | 8/2012 | Sugiyama | |
| 2012/0233003 A1 * | 9/2012 | Calman | G06Q 30/06 705/16 |
| 2012/0233015 A1 * | 9/2012 | Calman | G06K 9/00744 705/26.8 |
| 2012/0260248 A1 * | 10/2012 | Katiyar | G06F 9/45533 718/1 |
| 2012/0296770 A1 | 11/2012 | Lin et al. | |
| 2012/0311476 A1 * | 12/2012 | Campbell | G06F 3/04886 715/773 |
| 2013/0006803 A1 * | 1/2013 | Oskolkov | G06Q 30/06 705/26.8 |
| 2013/0080289 A1 | 3/2013 | Roy et al. | |
| 2013/0125069 A1 * | 5/2013 | Bourdev | G06F 3/04845 715/863 |
| 2013/0297425 A1 | 11/2013 | Wallaja | |
| 2013/0311335 A1 * | 11/2013 | Howard | G06Q 30/0625 705/26.64 |
| 2013/0311768 A1 | 11/2013 | Fosmark et al. | |
| 2013/0332354 A1 | 12/2013 | Rhee et al. | |
| 2015/0106245 A1 * | 4/2015 | Mirajkar | G06Q 30/0283 705/30 |
| 2017/0039548 A1 | 2/2017 | Rhee et al. | |

FOREIGN PATENT DOCUMENTS

| | | |
|---|---|---|
| CN | 101196791 A | 6/2008 |
| CN | 102348013 A | 2/2012 |
| EP | 1 798 867 A2 | 6/2007 |
| EP | 2410482 A1 | 1/2012 |
| JP | 2001-266010 A | 9/2001 |
| JP | 2009-181224 A | 8/2009 |
| JP | 2010-20370 A | 1/2010 |
| JP | 2010-39619 A | 2/2010 |
| JP | 2010-198597 A | 9/2010 |
| JP | 2011-210171 A | 10/2011 |
| JP | 2012-43300 A | 3/2012 |
| JP | 2012-507229 A | 3/2012 |
| JP | 2012-508930 A | 4/2012 |
| JP | 6695616 B2 | 5/2020 |
| KR | 2002-005418 A | 1/2002 |
| KR | 10-0650256 B1 | 11/2006 |
| KR | 10-2006-0129825 A | 12/2006 |
| KR | 20-2008-0000004 U | 1/2008 |
| KR | 10-2010-0003587 A | 1/2010 |
| KR | 10-2010-0110568 A | 10/2010 |
| KR | 10-2010-0127525 A | 12/2010 |

(56) References Cited

FOREIGN PATENT DOCUMENTS

| KR | 10-2011-0016107 A | 2/2011 |
|---|---|---|
| KR | 10-2011-0025752 A | 3/2011 |
| KR | 10-2011-0049765 A | 5/2011 |
| KR | 10-2011-0103598 A | 9/2011 |
| KR | 10-2011-0139570 A | 12/2011 |
| KR | 10-2012-0043253 A | 5/2012 |
| KR | 10-1156000 B1 | 7/2012 |
| WO | 0072241 A1 | 11/2000 |
| WO | 2010/114251 A2 | 10/2010 |
| WO | 2011/043422 A1 | 4/2011 |

OTHER PUBLICATIONS

International Search Report (PCT/ISA/210), dated Oct. 16, 2013, issued by the International Searching Authority in counterpart International Patent Application No. PCT/KR2013/005127.
Communication dated Apr. 2, 2018, issued by the Japanese Patent Office in counterpart Japanese Patent Application No. 2013-122763.
Anonymous, "Sagem Wireless and Upek Partner to Bring Fingerprint-Based Identity Capabilities to New Mobile Devices", Business Wire, Feb. 3, 2010, retrieved from <http://www.sec.gov/Archives/edgar/data/1138830/000119312510020600/d425.htm>.
Office Action dated Sep. 30, 2016 issued by United States Patent and Trademark Office in counterpart U.S. Appl. No. 14/100,449.
Written Opinion (PCT/ISA/237), dated Oct. 16, 2013, issued by the International Searching Authority in counterpart International Patent Application No. PCT/KR2013/005127.
Communication dated Apr. 24, 2018, from the State Intellectual Property Office of People's Republic of China in counterpart Application No. 201380030910.8.
Communication dated Sep. 30, 2017, issued by the State Intellectual Property Office of P.R. China in counterpart Chinese application No. 201310233994.7.
Communication dated Mar. 20, 2017, issued by the State Intellectual Property Office of P.R. China in counterpart Chinese Application No. 201380030910.8.
Communication dated May 13, 2016, issued by the European Patent Office in counterpart European Application No. 13804676.8.
Communication dated May 21, 2015 issued by United States Patent and Trademark Office in counterpart U.S. Appl. No. 13/915,173.
Communication dated Nov. 30, 2018 issued by the State Intellectual Property Office of P.R. China in counterpart Chinese Application No. 201380030910.8.
"Biometric Phone: Pantech GI100", 2001, 2 pages, retrieved from URL <https://gizmodo.com/026663/biometric-phone-pantech-gi100>.
Office Action dated Feb. 6, 2018, issued by the United States Patent and Trademark Office in counterpart U.S. Appl. No. 15/332,544.
Communication dated Nov. 6, 2017, issued by the State Intellectual Property Office of P.R. China in counterpart Chinese application No. 201380030910.8.
Communication dated Apr. 1, 2017, issued by the State Intellectual Property Office of P.R. China in counterpart Chinese Application No. 201310233994.7.
Notice of Allowance dated Jul. 6, 2016 by the United States Patent and Trademark Office in related U.S. Appl. No. 13/915,173.
Communication dated Jul. 10, 2017 by the Japanese Patent Office in counterpart Japanese Patent Application No. 2013-122763.
Communication dated Jan. 8, 2014 issued by the European Patent Office in counterpart European Patent Application No. 13171291.1.
Communication dated Jan. 3, 2019 issued by the European Intellectual Property Office in counterpart European Application No. 13 804 676.8.
Office Action dated Feb. 7, 2018, issued by the United States Patent and Trademark Office in counterpart U.S. Appl. No. 14/100,449.
Communication dated Jul. 12, 2018, issued by the European Patent Office in counterpart European Application No. 18168614.8.
Office Action dated Apr. 14, 2017, issued by the United States Patent and Trademark Office in counterpart U.S. Appl. No. 14/100,449.
Notice of Allowance dated Jul. 25, 2018, issued by the United States Patent and Trademark Office in U.S. Appl. No. 15/332,544.
Office Action dated Aug. 10, 2018, issued by the United States Patent and Trademark Office in U.S. Appl. No. 14/100,449.
Communication dated Mar. 18, 2019, issued by the Korean Intellectual Property Office in counterpart Korean Patent Application No. 10-2013-0001797.
Communication dated Feb. 22, 2019, issued by the Korean Intellectual Property Office in counterpart Korean Patent Application No. 10-2013-0001779.
Notice of Allowance dated Sep. 14, 2015 by the United States Patent and Trademark Office in related U.S. Appl. No. 13/915,173.
Communication dated Dec. 22, 2015 issued by European Patent Office in counterpart European Patent Application No. 13804676.8.
Communication dated Nov. 12, 2018 issued by the Japanese Intellectual Property Office in counterpart Japanese Application No. 2013-122763.
Communication dated Jun. 10, 2019 issued by the Japanese Patent Office in counterpart Japanese Application No. 2013-122763.
Communication dated Jun. 26, 2019 issued by the United States Patent Office in U.S. Appl. No. 14/100,449.
Microsoft ,"Computer Dictionary", Fifth Edition, definition of 'menu', 2002, 3 pages total.
Communication dated Aug. 29, 2019 by the Korean Intellectual Property Office in counterpart Korean Patent Application No. 10-2013-0001779.
Office Action dated Sep. 5, 2019 by the United States Patent and Trademark Office in U.S. Appl. No. 15/332,544.
Communication dated Nov. 13, 2019 issued by the European Patent Office in counterpart European Patent Application No. 19190709.6.
Office Action dated Jan. 9, 2020 issued by the United States Patent and Trademark Office in U.S. Appl. No. 14/100,449.
Office Action dated Feb. 18, 2020 issued by the United States Patent and Trademark Office in U.S. Appl. No. 15/332,544.
Communication dated Jun. 8, 2020, issued by the Japanese Patent Office in Japanese Application No. 2019-045256.
Communication dated Jul. 31, 2020, issued by the Korean Intellectual Property Office in Korean Application No. 10-2020-0090695.
Notice of Allowance dated Jun. 15, 2020, issued by the U.S. Patent and Trademark Office in U.S. Appl. No. 15/332,544.
Daniel Wigdor & Dennis Wixon, "Brave NUI world: Designing Natural User Interfaces for Touch and Gesture"; Elsevier Science & Technology. 2011, Retrieved in U.S. Appl. No. 15/332,544.
Office Action dated Jan. 8, 2021, issued by the United States Patent and Trademark Office in U.S. Appl. No. 14/100,449.
Communication dated Feb. 25, 2021, issued by the Korean Intellectual Property Office in Korean Application No. 10-2020-0090695.

\* cited by examiner (a)

(b)

(c)

(a)

(b)

USER TERMINAL DEVICE FOR PROVIDING ELECTRONIC SHOPPING SERVICE AND METHODS THEREOF

CROSS-REFERENCE TO RELATED APPLICATIONS

This application is a Continuation of U.S. application Ser. No. 13/915,091, filed Jun. 11, 2013, which claims priority from Korean Patent Application No. 10-2013-0001797, filed on Jan. 7, 2013 in the Korean Intellectual Property Office and claims benefit from U.S. Provisional Application No. 61/658,156, filed on Jun. 11, 2012, the disclosures of which are incorporated herein by reference in their entireties.

BACKGROUND

1. Field

Devices and methods consistent with exemplary embodiments disclosed herein relate to a user terminal device which provides an electronic shopping service, a server, and methods thereof.

2. Description of the Related Art

Strengthened with development of electronic technologies, various types of user terminal devices are now used. Further, the distribution of user terminal devices having high performance, such as smart phone and tablet PC, has greatly expanded.

Additionally, the types of services provided by user terminal devices have also been enhanced. Specifically, the intention of a user using the user terminal device has changed to favor faster, easier, and simpler services. In view of this situation, services that can be provided from the user terminal devices are continuously researched in many places.

One such exemplary service is a shopping service. Historically, shopping can be done by using cash or credit cards at offline locations. However, customers recently began shopping in a way that allows products to be ordered at an online shopping mall with a personal computer where payment uses a credit card authentication method, a cellular phone authentication method, or a deposit without a bankbook.

When using these online shopping services, customers may find the online shopping services inconvenient to have credit cards or other payment tools for payment. Thus, the user terminal device has limits when providing shopping services.

Therefore, there is a growing need for the development of new technology so that shopping services can be provided to a user more conveniently and efficiently by using the user terminal device.

SUMMARY

Exemplary embodiments overcome the above disadvantages and other disadvantages not described above. Also, the exemplary embodiments are not required to overcome the disadvantages described above, and the exemplary embodiments may not overcome any of the issues described above.

According to aspects of the exemplary embodiments, a technical objective is to provide a user terminal device which provides convenient and efficient shopping services, a server, a shopping system including the user terminal device and the server, and a method thereof.

According to aspects of the exemplary embodiments, a user terminal device may include, a display, a sensor which detects a user input on the display, a controller which extracts objects displayed within an area on the display indicated by the user input on the display and adds the objects to a wish list, and a memory which stores the wish list.

Herein, the controller further can add price information to the wish list by comparing prices of the objects on the wish list and prices of the objects in response to the area on the display being revisited.

The user terminal device may further include a nearfield wireless communicator configured to receive a payment request to pay a price for an object.

Further, the controller may determine whether the object is registered in the wish list in response to the nearfield wireless communicator receiving the payment request, determine whether the price is lowest among the prices in the wish list for the object.

According to an aspect of another exemplary embodiment, a method of providing shopping service in a user terminal device may include displaying shopping screen on a display, detecting a user input on the display, extracting objects displayed within an area on the display indicated by the user input on the display, adding the objects to a wish list, and storing the wish list in a memory.

Herein, the method may further include adding price information to the wish list by comparing prices of the objects on the wish list and prices of the objects displayed in response to the area being revisited.

Further, when receiving a payment request to pay a price for an object at a nearfield wireless communicator, the method may further include determining whether the object is registered in the wish list in response to the nearfield wireless communicator receiving the payment request, and determining whether the price is lowest among the prices in the wish list for the object.

According to an aspect of another exemplary embodiment, a host may include a memory which stores customer information of a user and a purchasing record of the user, a communicator which receives a payment request from a user terminal device, an additional service manager which determines additional service information provided to a user based on the purchasing record in response to the communicator receiving the payment request, and a controller which creates an electronic receipt by processing payment according to the payment request, adds the additional service information to the electronic receipt, and issues the electronic receipt through the communicator to the user terminal device.

Herein, the additional service information may include at least one of information regarding coupon to be issued for the user, stamp coupon information, and event information.

According to an aspect of another exemplary embodiment, a user terminal device includes a memory which stores a purchasing record comprising time, place, and activity information, a controller which analyzes the time, place, and activity information for a repeating purchase activity pattern, create an informing condition that is met at a next projected purchase activity from the repeating purchase activity pattern, and stores the informing record in the memory; and a display which displays an informing message in response to the informing condition being met.

According to an aspect of another exemplary embodiment, a user terminal device may include a memory, a communicator which receives an electronic receipt from a host; and a controller which searches for contents corresponding to an issuing time and an issuing location of the electronic receipt from at least one of the memory and an external server, adds the searched contents to the electronic receipt, and stores the electronic receipt to which the contents are added in the memory.

According to the exemplary embodiments, various shopping service may be provided by using the user terminal device. Therefore, shopping can be more convenient and efficient.

BRIEF DESCRIPTION OF THE DRAWINGS

The above and other aspects will be more apparent by describing certain exemplary embodiments with reference to the accompanying drawings, in which.

DETAILED DESCRIPTION OF EXEMPLARY EMBODIMENTS

Figure 1:
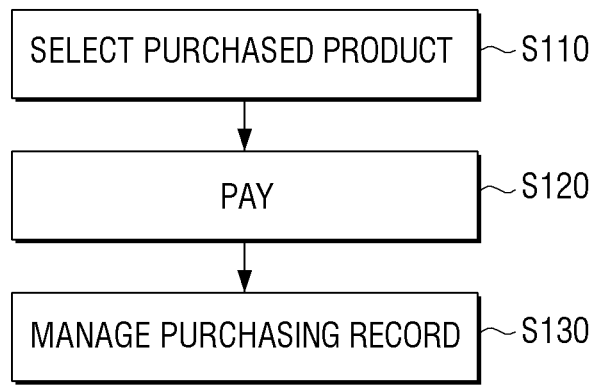
FIG. 1 is a flowchart of a shopping service process.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of one or more exemplary embodiments. Accordingly, it is apparent that the exemplary embodiments can be carried out without those specifically defined matters. Also, well-known functions or constructions are not described in detail because they would obscure one or more exemplary embodiments with unnecessary detail.

Referring to the attached drawings, one or more exemplary embodiments will be described in detail below.

FIG. 1 is a diagram briefly explaining a process which provides shopping service according to an exemplary embodiment. Shopping service indicates service where a user can search, select, and pay products by using a user terminal device that he separately installs.

Referring to FIG. 1, a user selects a product that the user wishes to purchase at S110 and performs payment by user authentication at S120. A request for selecting and paying the product that is being purchased may be performed on screen of the user terminal device or offline, which is separate from the user terminal device.

User authentication may be performed with various methods such as inputting password and secret numbers, issuing a cellular phone authentication number, a radio-frequency identification (RFID) authentication, and using public authentication. Payment records of a user may be stored and managed in the user terminal device or an external server at S130.

Figure 2:
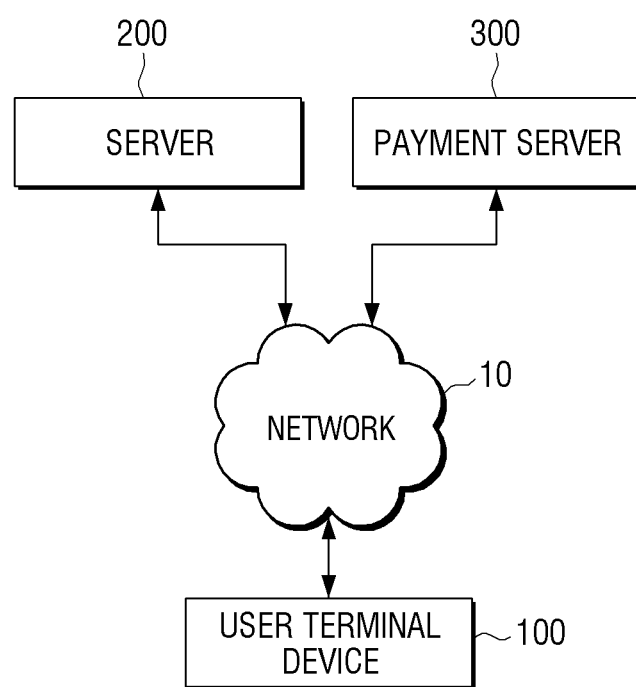
FIG. 2 is a block diagram illustrating a shopping system which provides online shopping service.

FIG. 2 is a block diagram illustrating a shopping system which provides online shopping service. Referring to FIG. 2, the shopping system may include a user terminal device 100, a server 200, and a payment server 300. Although FIG. 2 illustrates an individual user terminal device 100, server 200 and payment server 300, each may be implemented as a plurality of user terminal devices, servers, and payment servers.

The user terminal device 100 may be a cellular phone, a tablet PC, a notebook PC, a PDA, an electronic book, an electronic note, a MP3 player, or other various mobile devices. The server 200 may connect through the user terminal device 100 and a network 10 and provide a shopping screen or other information. The server 200 may be implemented as various servers such as a managing server which manages different types of online shopping mall sites, a portal site server, a cloud server, etc. The payment server 300 indicates to a device a price of the product that can be paid. The payment server 300 may be a server managed by different types of card companies, banks, or other financial companies, and a server of service companies which provides a point of sale (POS) system and other payment representing services. The network 10 may include various types of networks such as the internet, a mobile communication network, and a telephone network.

Figure 3:
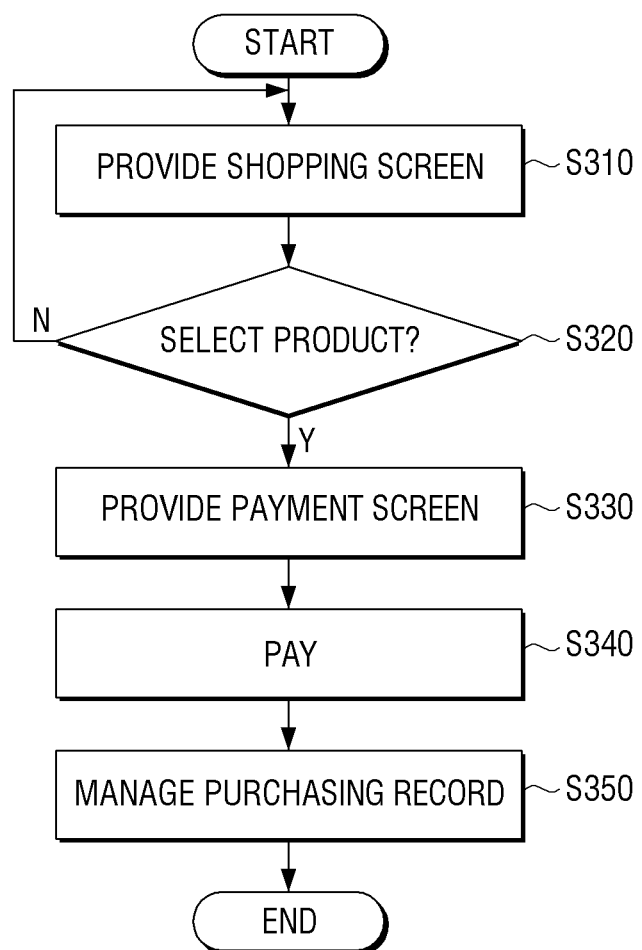
FIG. 3 is a flowchart illustrating a method of providing a shopping service by the shopping system of FIG. 2.

FIG. 3 is a flowchart illustrating a method of providing a shopping service which is implemented in the shopping system of FIG. 2. Referring to FIG. 3, a user of the user terminal device 100 may implement a web browser, and an input site address which the server 200 manages. The user terminal device 100 receives shopping screen data by accessing to the server 200 based on the inputted address. Therefore, the user terminal device 100 provides a shopping screen at S310.

A user may select a product to be purchased on the shopping screen at S320. To select a product, he may create a wish list. In the related art, a web site providing shopping environment displays a menu to create wish list and a user creates a wish list by using the displayed menu; however, according to an exemplary embodiment, a wish list may be simply created according to user gestures in the user terminal device without providing another menu. Specific exemplary embodiments regarding methods of creating a wish list and using the wish list will be explained below. A user may select a product to be purchased on the shopping screen itself or the wish list.

The user terminal device provides a payment screen at S330 when a product is selected. The user terminal device may transmit information that is inputted through the payment screen to the server 200 or the payment server 300, and performs a payment at S340. Because a payment method may be variously implemented as described below, the payment method will be explained broadly.

The user terminal device 100 or the server 200 stores and manages a purchasing record at S350 when the purchasing completes after being paid. The user terminal device 100 may provide additional information by using the purchasing record. Specific exemplary embodiments regarding the above will be described below.

Figure 4:
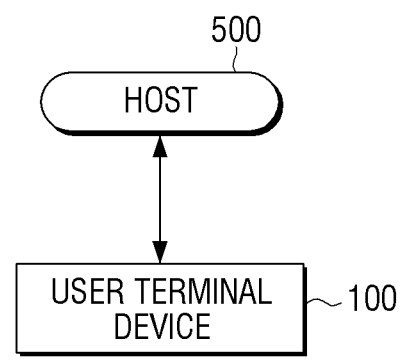
FIG. 4 is a block diagram illustrating exemplary composition of a shopping system which provides payment service.

FIG. 4 is a block diagram illustrating exemplary composition of a shopping system which provides payment service. Referring to FIG. 4, the shopping system includes the user terminal device 100 and a host 500. The user terminal device 100 may be implemented as various types of mobile devices as described above. The host 500 is device which performs a payment by communicating with the user terminal device 100. Specifically, the host 500 may be implemented as a point of sale (POS) system installed at a shop. The host 500 and the user terminal device 100 may communicate according to communication methods such as nearfield frequency communication (NFC) or RFID. The user terminal device 100 may perform a payment by implementing a payment program.

Figure 5:
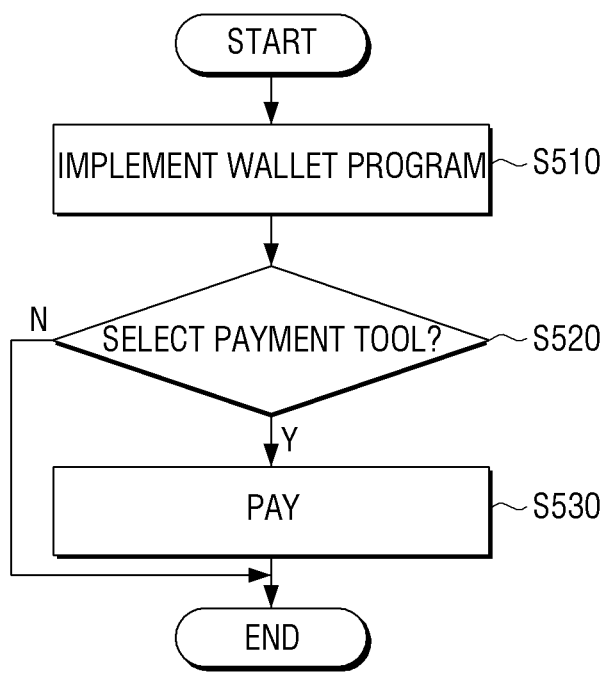
FIG. 5 is a flowchart illustrating a method of providing a payment service by a user terminal device included in the shopping system of FIG. 4.

FIG. 5 is a flowchart illustrating a method of shopping service implemented in the shopping system of FIG. 4. Referring to FIG. 5, the user terminal device implements a wallet program at S510, and displays different sorts of payment tools at S520. Payment tools may be credit card manufactured and authorized by card companies. Specifically, the user terminal device may display a list of credit card information which a user is provided. The credit card information may be paired with a credit card image, card number, bar code, and quick response (QR) code. When a user selects a particular credit card information, payment is performed with the selected credit card information at S530. For example, when bar code or QR code is paired with the credit card information, the host 500 confirms with a corresponding payment server and a user account by reading the bar code or QR code. Therefore, the payment request is transmitted toward the confirmed payment server and user account. Further, the user terminal device 100 may display a personal identification number (PIN) input screen to a receive user ID or password. Thereby, when a user inputs a user ID or password, the inputted information is transmitted to the external server and authentication is performed. When authentication succeeds, a request for approving the payment price is transmitted and approval is received. Thus, payment may be performed according to various methods.

The user terminal device may provide shopping service according to various methods. Shopping service may be divided into a process of selecting a product to be purchased, a payment process, which includes performing purchasing of the selected product, and a management process, which includes using a purchasing record after payment completes. Each process may be performed with various methods according to various exemplary embodiments. In the following, various exemplary embodiments regarding each process will be explained.

Figure 6:
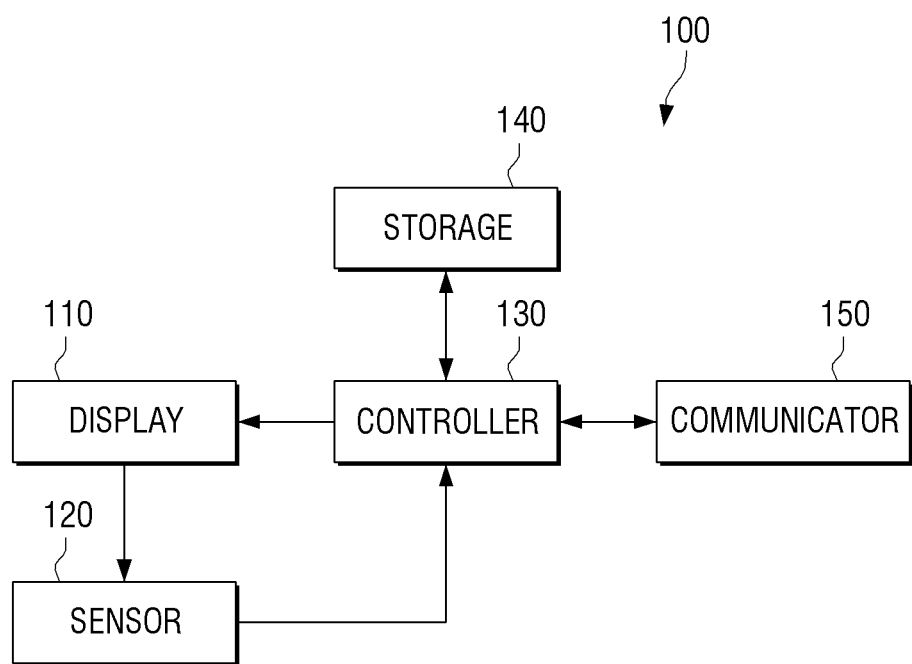
FIG. 6 is a block diagram of a user terminal device according to an exemplary embodiment.

FIG. 6 is a block diagram of the user terminal device according to an exemplary embodiment. Referring to FIG. 6, the user terminal device 100 includes a display 110, a sensor 120, a controller 130, a storage 140, and a communicator 150.

The communicator 150 performs communication with various external devices as well as the server. The communicator 150 may communicate with external devices by using various communication methods such as IEEE, WiFi, Zigbee and Bluetooth.

The display 110 may display various screens according to the controlling abilities of the controller 130. For example, the display 110 may display a home screen or a background screen when the user terminal device 100 turns on. Further, the display 110 may display an application implementation screen when applications are implemented, and lock the screen when button manipulation or user gestures are sensed while the user terminal device 100 is locked on. Further, the display 110 may display a screen corresponding to screen data when the communicator 150 accesses an online shopping mall site or other web sites and receives associated screen data. A screen used to perform shopping may be referred to as a shopping screen.

The sensor 120 may sense user manipulation implemented on the screen of the display 110. The sensor 120 may be implemented as various types of sensors such as touch sensor, pressure sensor, camera, motion recognizing sensor, and microphone.

When implementing a touch sensor, several types of sensors such as electrostatic sensor, resistive sensor, and piezoelectric sensors may be used. The electrostatic sensor is a sensor using a method to calculate touch coordinates by sensing micro electricity excited by the user body when parts of a user body touch the surface of the display 110. The resistive sensor is a sensor using a method to include two electrode plates and to calculate touch coordinates by sensing that electricity flows caused by contacting upper and lower plates of the touched point, when a user touches the screen. As described, the sensor 120 may be implemented as various types. Therefore, the sensor 120 may sense various touch manipulation such as touch, touch and drag, flick, long touch and double touch.

Specifically, when the sensor 120 is implemented as touch sensor, a user may define a part of area within the screen by touching and dragging or flicking the screen of the display 110.

The controller 130 determines area defined by user manipulation within the screen of the display 110. Further, the controller 130 extracts objects marked within the defined area. Objects may be texts such as image, character, symbol and number. The controller 130 creates a wish list by using the extracted objects. The wish list indicates data which assemble products that a user takes interest and arrange the products in a list format.

When a wish list is created, the controller 130 stores the created wish list in the storage 140.

The storage 140 may store programs such as operating system (O/S) for operating the user terminal device 100 or other sorts of applications, contents or other data as well as the wish list.

When events causing the wish list to be displayed occur while a wish list is stored in the storage 140, the controller 130 reads the wish list stored in the storage 140 and displays the wish list on the screen of the display 110. Events to display the wish list may be at least one of various events such as event to select display menu of the wish list, event to display shopping mall site that is selling products registered on the wish list, event to approach to preset time interval, and event to implement web browser.

When a user selects one product on the wish list, the controller 130 provides shopping service regarding the selected product.

The controller 130 may frequently update the stored wish list in the storage 140. For example, when information regarding the product same as registered product on the wish list is extracted from another shopping screen, the controller 130 may update the wish list by comparing the extracted information and the stored information on the wish list.

Further, when a user revisits an address of the web site providing shopping screen after creating the wish list, the controller 130 compares a price of the registered product on the wish list with price of product displayed on the revisited shopping screen. Therefore, based on the comparing results, the wish list may be updated.

Updating may be performed according to various methods. For example, previous price or previous option information may be completely deleted and new price or new option information may be substituted. Otherwise, updating may be implemented such that the new price or new option information is marked while keeping previous price or previous option information. This allows a user the ability to confirm changes in the information. Further, new information such as discount rate or discount price may be created by comparing previous and current prices and added to the wish list.

Figure 7:
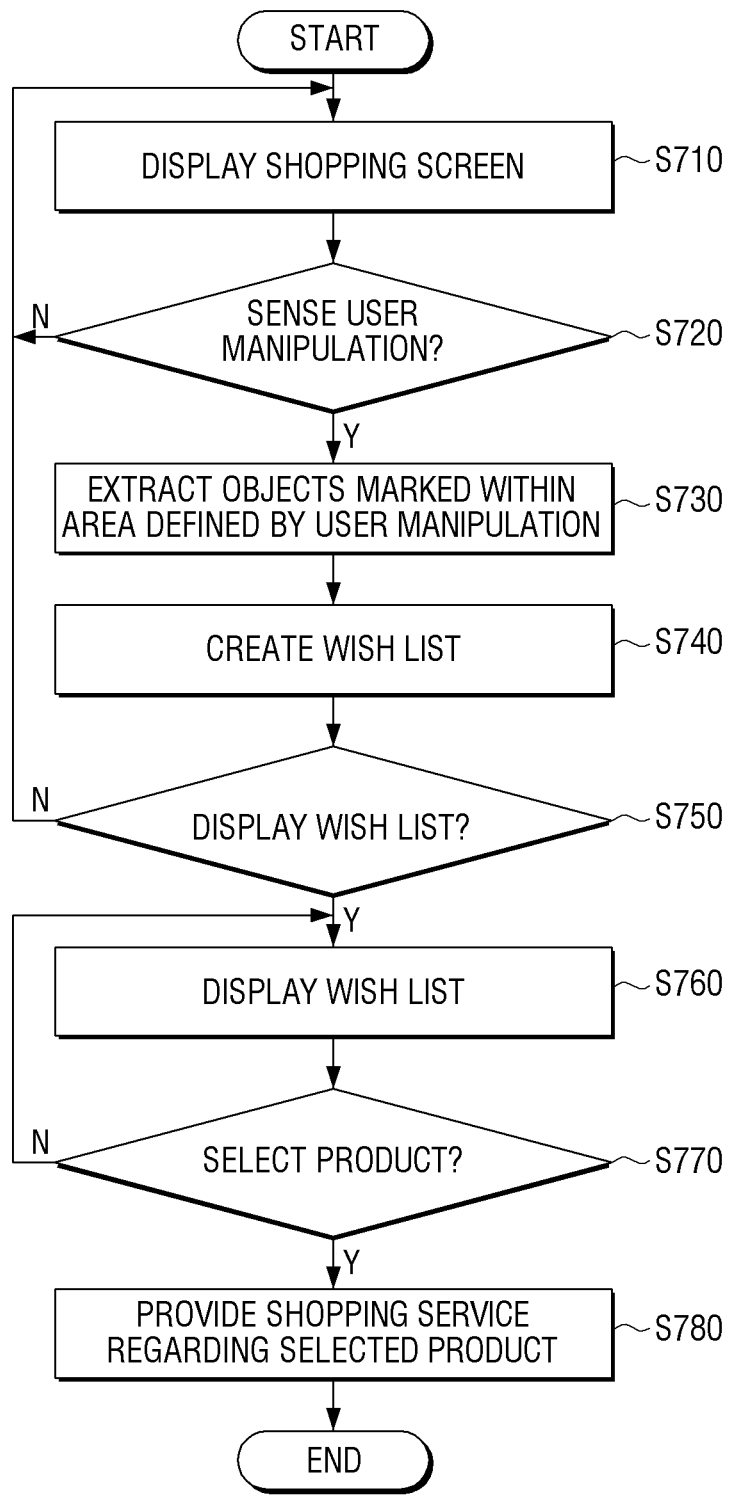
FIG. 7 is a flowchart illustrating a method of providing a shopping service according to one or more exemplary embodiments.

FIG. 7 is a flowchart illustrating a method of providing a shopping service according to an exemplary embodiment. Referring to FIG. 7, the user terminal device displays shopping screen at S710. When user manipulation is sensed on the shopping screen at S720, the user terminal device extracts objects displayed within the area defined by user manipulation at S730.

The user terminal device creates wish list by using the extracted objects at S740. In this situation, when events to display the wish list occur at S750, the user terminal device displays the wish list at S760. When a product is selected on the wish list at S770, shopping service regarding the selected product is provided at S780. Specifically, the controller 130 controls the communicator 150 to access a server corresponding to the selected product. Therefore, the controller 130 transmits a purchasing request through the communicator 150. The server receiving the purchasing request transmits screen data to determine detail option, and the controller 130 consecutively displays a screen corresponding to the transmitted data. During this process, a payment screen to input payment method, a payment tool, and payment information may be displayed. When a user inputs information within the payment screen, the controller 130 transmits the inputted information through the communicator 150 to the payment server. Therefore, when payment performs, shopping completes.

Figure 8:
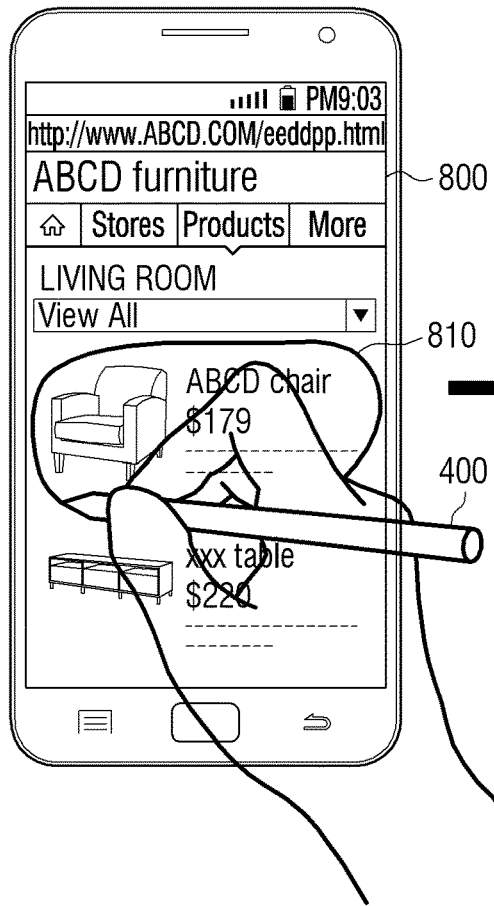
FIG. 8 illustrates user gestures to generate a wish list and composition of the generated wish list according to an exemplary embodiment.
Figure 8:
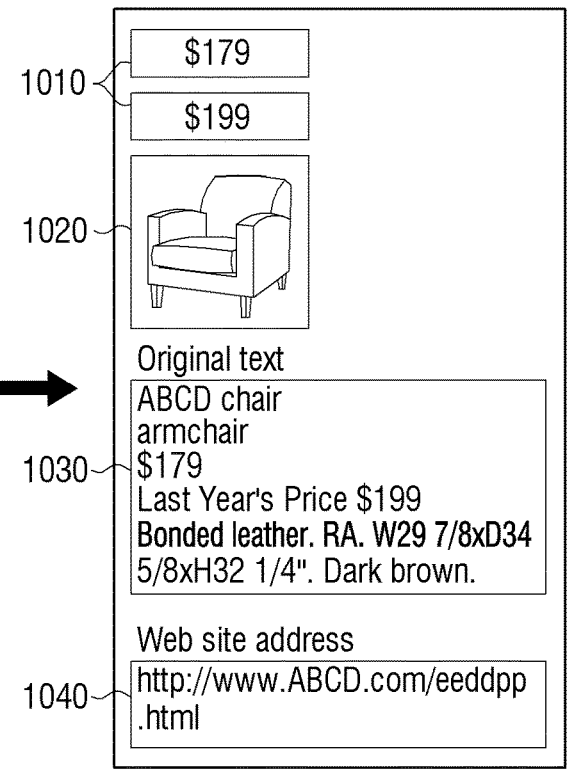
Figure 8:
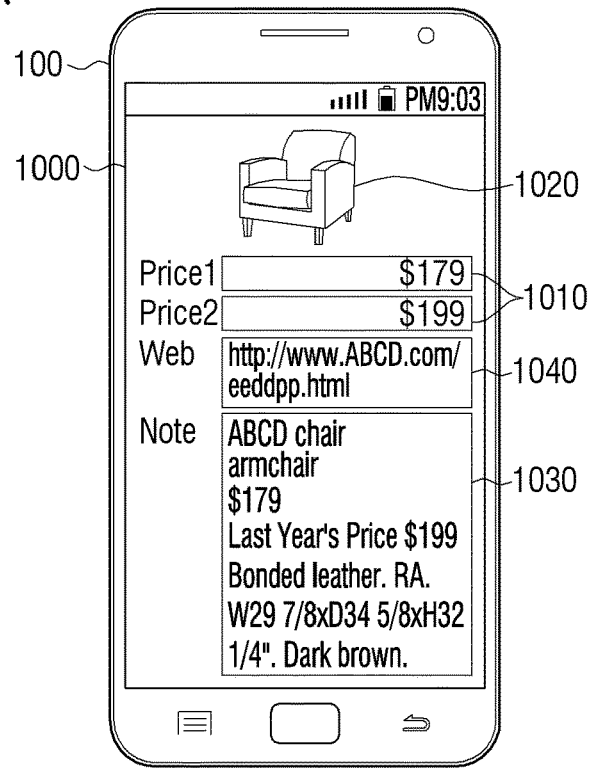

FIG. 8 illustrates an example of methods which create a wish list, specifically, FIG. 8 illustrates user gestures to generate a wish list and composition of the generated wish list. Referring to FIG. 8, the user terminal device displays shopping screen 800 provided from web server. The shopping screen 800 may include various objects such as a product image, price, detail information, manufacturer, manufacturer address, home page address, and contact information.

A user may extract objects by taking preset types of gestures on the shopping screen 800. Referring to (a) of FIG. 8, it is illustrated that a user touches the screen 800 with a pen 400, and selects an area by drawing a closed curve 810 while maintaining contact. The controller 130 extracts all of the objects created within the selected area.

Referring to (b) of FIG. 8, the extracted objects are illustrated. The controller 130 creates wish list by classifying the extracted objects according to a plurality of classification items. For example, when special symbols such as $ and \ indicating monetary unit are marked with numbers, the controller 130 classifies the text as price information 1010. Further, when images are included, the controller 130 classifies corresponding images as a product image 1020. Besides, the controller 130 may extract original texts 1030 marked within the selected area and web site address 1040 providing corresponding shopping screen as objects.

The controller 130 creates wish list by arranging the extracted objects. Referring to (c) of FIG. 8, wish list 1000 includes the product image 1020, the price information 1010, the web site information 1040, and the original text 1030. The controller 130 stores the created wish list on the storage 140.

Figure 9:
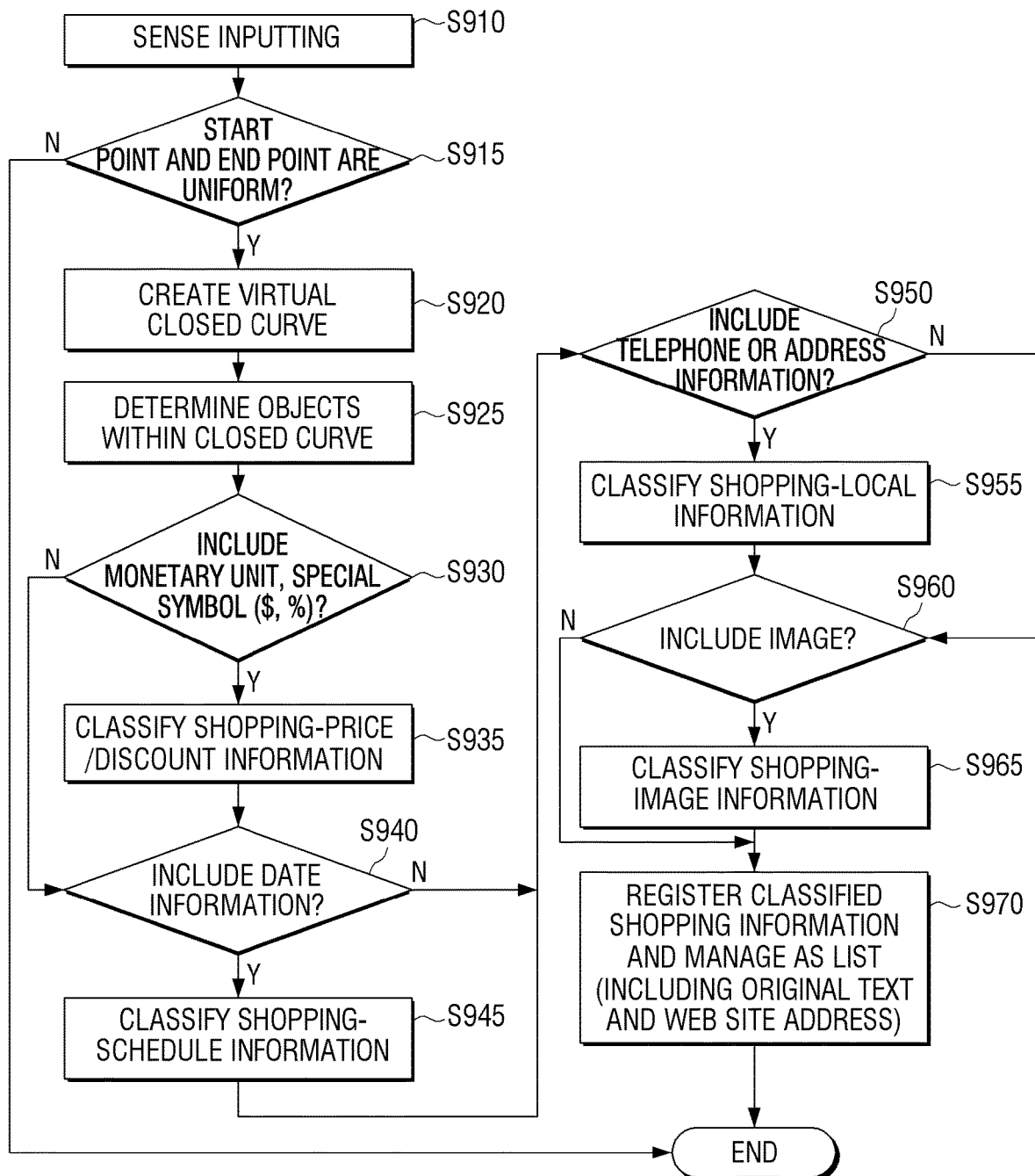
FIG. 9 is a flowchart explaining a method of generating a wish list according to an exemplary embodiment.

FIG. 9 is a flowchart illustrating a specific method of creating wish list according to user manipulation. Referring to FIG. 9, when input is sensed on shopping screen at S910, the controller 130 determines whether the start point and the end point where the touch performs are uniform at S915.

When determining that the start point is the same as the end point based on touch coordinates, the controller 130 creates a virtual closed curve at S920 and determines objects within the closed curve area at S925.

As determining results, if special symbols such as $ and \ indicating monetary unit or % are included at S930, texts including the special symbols are classified as shopping-price/discount information at S935.

Further, if words indicating a date such as a year, month and day are included at S940, text including the words are classified as shopping-schedule information at S945.

Further, if numbers are consecutively arranged and determined to be a unit or words indicating an address such as city, district, town and road as included at S950, texts including the words are classified as shopping-local information at S955.

Further, if images are included at S960, the images are classified as shopping-image information at S965.

The user terminal device registers the classified shopping information on wish list and manages the list at S970. Although not illustrated in FIG. 9, the user terminal device may manage the list only if shopping information are classified as more than two types. Further, the list may include original texts or web site address at S970.

Figure 10:
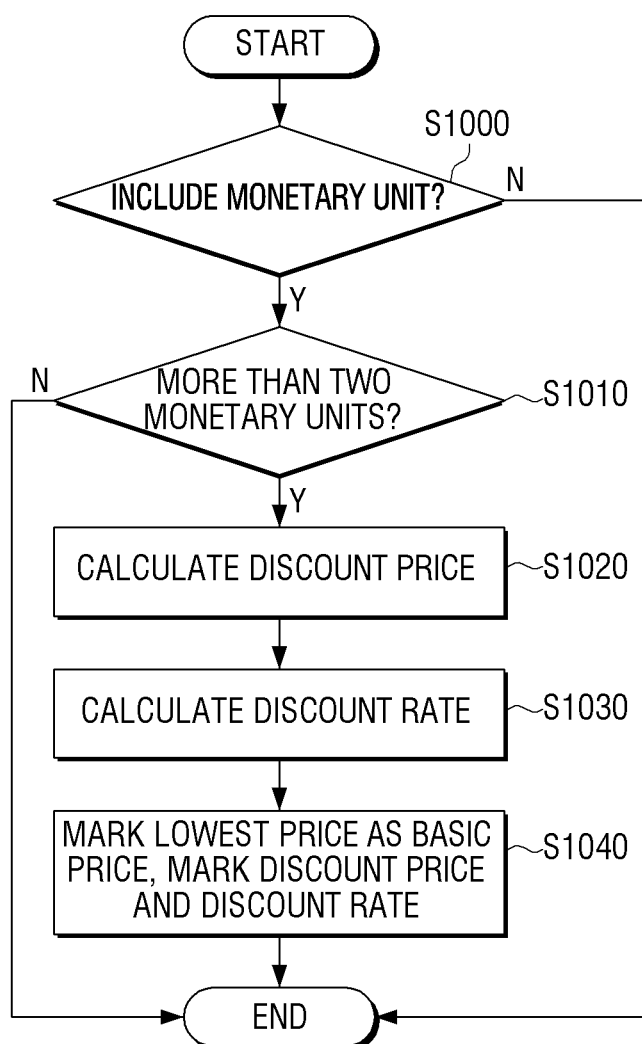
FIG. 10 is a flowchart explaining a method of generating a wish list according to an exemplary embodiment.

As described, the user terminal device may create and store wish list. FIG. 10 is a flowchart explaining another method of creating wish list.

FIG. 10 is a flowchart explaining a method of generating a wish list according to an exemplary embodiment. Referring to FIG. 10, when monetary unit is included within the area defined by a user at S1000, the user terminal device determines whether the monetary unit is counted as plural or not at S1010. When the monetary unit is counted as plural, the user terminal device determines the biggest number as the highest price and the smallest number as the lowest price by comparing numbers prior or posterior to the monetary unit. Further, the user terminal device calculates a difference between the highest price and the lowest price as discount price at S1020.

Further, the user terminal device may calculate a discount rate at S1030. The user terminal device may calculate a discount rate on a % basis by using a formula such as {(highest price-lowest price)/highest price}×100.

When a lowest price, a discount price, and a discount rate are calculated, the user terminal device displays the wish list by using the lowest price, discount price, and discount rate at S1040. Specifically, the user terminal device marks the lowest price as basic price, and marks the discount price and discount rate on the wish list.

Figure 11:
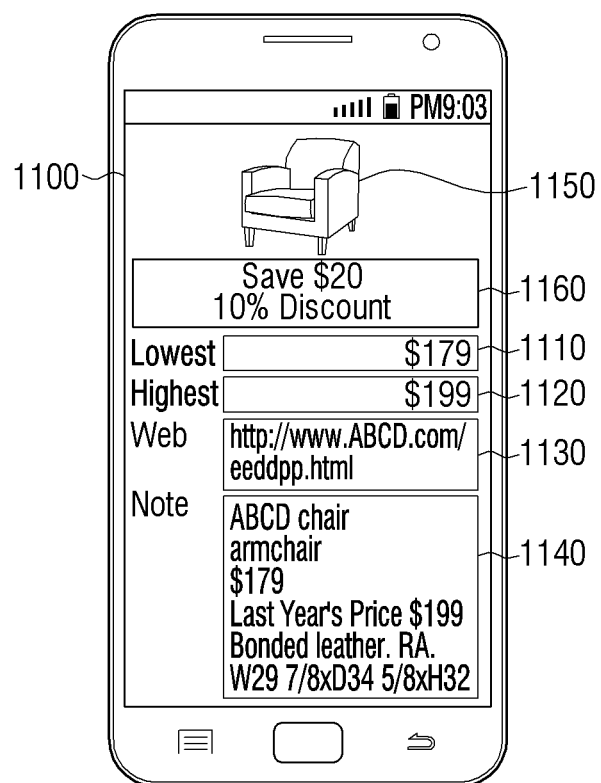
FIG. 11 illustrates an exemplary composition of the generated wish list according to the method of FIG. 10 according to an exemplary embodiment.

FIG. 11 illustrates an example of a wish list created by the method of FIG. 10. When two prices such as 199$ and 179$ are included within selected area, the user terminal device determines the lowest price, 179$, as basic price. Further, discount price is calculated to be 20$ and discount rate is calculated to be 10%.

The user terminal device displays information 1160 indicating the discount rate and the discount price with sorts of objects 1110, 1120, 1130, 1140, and 1150 which are extracted from the selected area.

Meanwhile, the user terminal device 100 may update the wish list when another information regarding the same product is collected after creating wish list.

Figure 12:
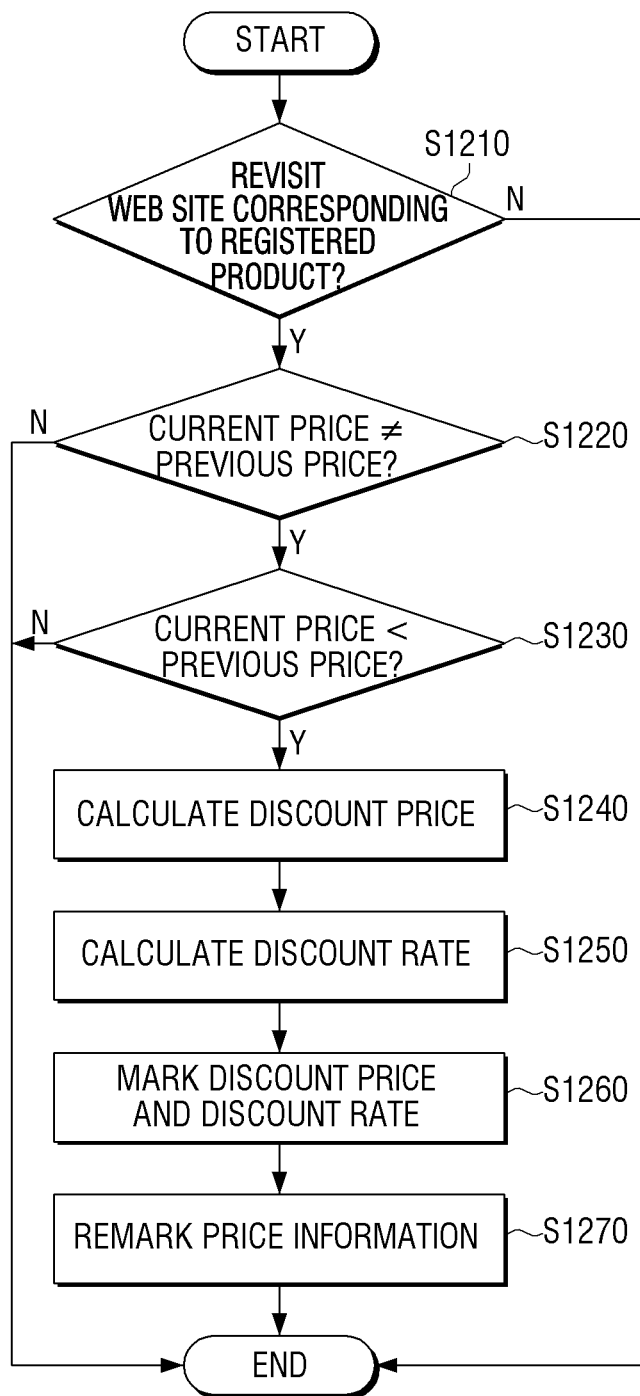
FIG. 12 is a flowchart illustrating a method of updating a wish list according to an exemplary embodiment.

FIG. 12 illustrates an example regarding a method of updating wish list.

FIG. 12 is a flowchart illustrating a method of updating a wish list according to an exemplary embodiment. Referring to FIG. 12, when the user terminal device revisits a web site address registered on the wish list, the user terminal device determines changes by comparing with the previously registered price, and updates information marked on the wish list according to the determining results.

Specifically, when the user terminal device revisits a web site corresponding to the product registered on the wish list at S1210, the user terminal device compares the price of the product marked on the revisited shopping screen with the price of the product registered on the wish list. Therefore, if current price is different from the registered price at S1220, the user terminal device determines whether current price is lower than the registered price at S1230.

When current price is lower than the registered price, the user terminal device determines that discount is performed. Therefore, the user terminal device calculates discount price by deducting current price from the registered price, and calculates discount rate at S1240, S1250. The user terminal device marks the calculated discount price and the calculated discount rate, and remarks price information at S1260, S1270. Although FIG. 12 illustrates the discount price and the discount rate only, the user terminal device may calculate and mark up-count price and up-count rate when current price is rising higher than the registered price.

Figure 13:
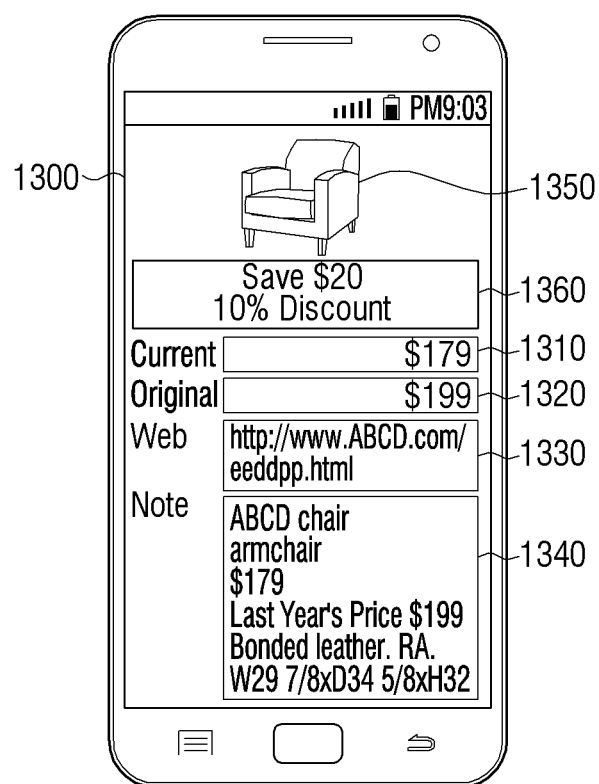
FIG. 13 illustrates an exemplary composition of an updated wish list according to an exemplary embodiment.

FIG. 13 illustrates a wish list updated by the method of FIG. 12. Referring to FIG. 13, wish list 1300 marks a plurality of objects 1310~1360. In FIG. 13, current price information 1310 and previous price information 1320 are marked. The user terminal device marks only one price information when creating wish list initially, and marks a plurality of price information 1310, 1320 as illustrated in FIG. 13 when new price information is added.

Figure 14:
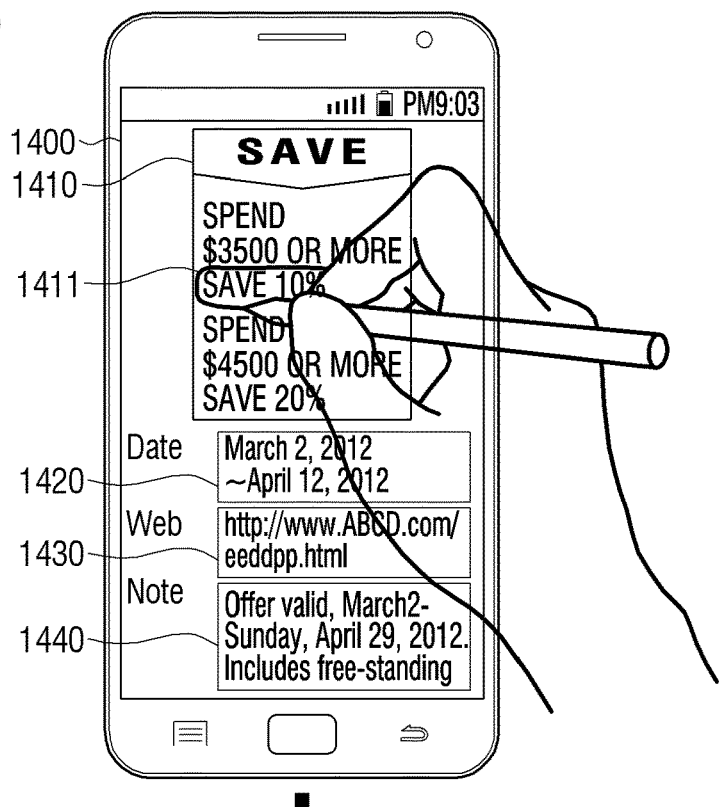
FIG. 14 is a diagram illustrating updating a wish list according to an exemplary embodiment.
Figure 14:
Figure 14:
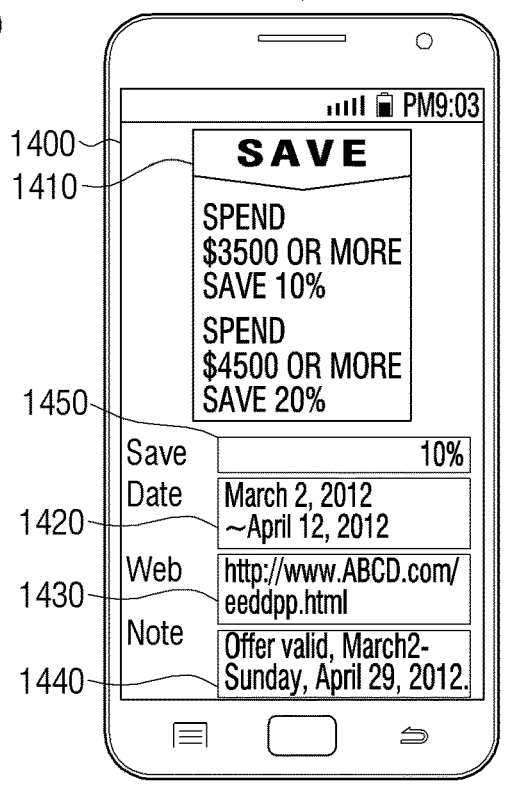

FIG. 14 is a diagram explaining a method that a user voluntarily adds items marked within wish list. Referring to FIG. 14, a image 1410, a schedule information 1420, a homepage information 1430, and other extra information 1440 are marked on wish list 1400. At this operation, when a user selects a specific area 1411 within the image 1410, an object marked within the selected area is additionally extracted again. Referring to (a) of FIG. 14, it is illustrated that texts of SAVE 10% is extracted.

Therefore, as illustrated in (b) of FIG. 14, an item indicating a discount rate (SAVE) is newly created on the wish list 1400, and information 1450 of 10% is marked regarding this item. The user terminal device may extract texts by using character recognizing technology.

In summary, the user terminal device may create wish list. The wish list may be used to directly access the web site which provides products to be purchased.

Meanwhile, the above describes that the user terminal device directly creates a wish list; however, a process of creating a wish list may be performed on another server other than the user terminal device. For example, when user gestures are inputted on a specific site, the user terminal device may inform the inputting to the server which provides the site. The server may create information of products marked within the currently displayed site as wish list format, and transmit to the user terminal device. Therefore, the user terminal device may store information provided from the external server and display wish list screen.

Besides, the wish list may be utilized with various methods. For example, the wish list may be utilized in a payment process. The following will specifically describe one or more exemplary embodiments utilizing the wish list.

Figure 15:
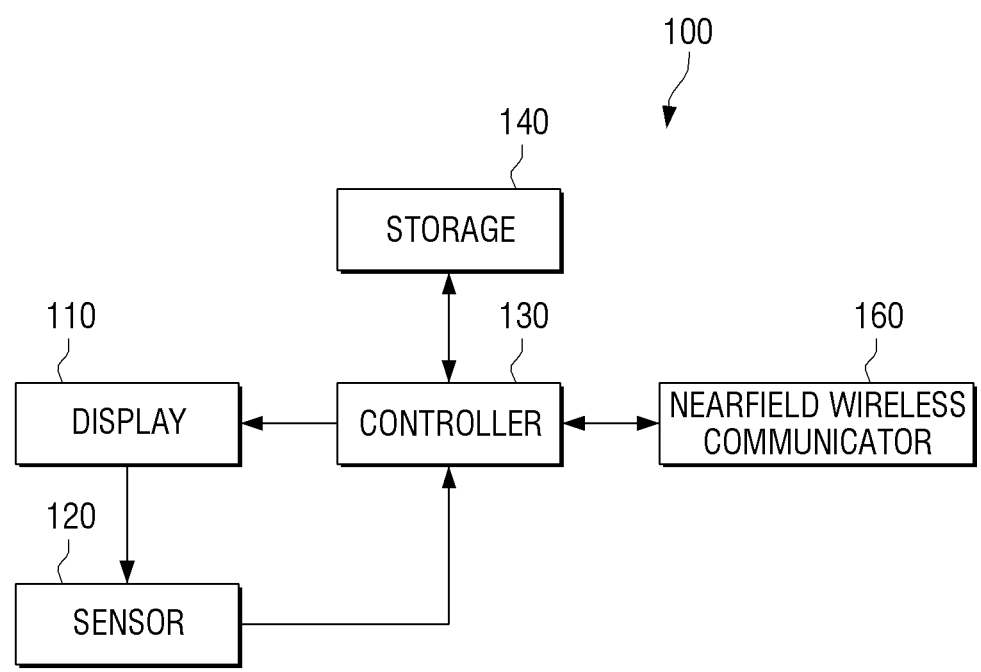
FIG. 15 is a block diagram of a user terminal device according to an exemplary embodiment.

FIG. 15 is block diagram of the user terminal device according to another exemplary embodiment. Referring to FIG. 15, the user terminal device 100 includes the display 110, the sensor 120, the controller 130, the storage 140 and a nearfield wireless communicator 160. The display 110 displays sorts of screens. The sensor 120 senses different sorts of user manipulation, which are also known as a user inputs.

The storage 140 may store O/S, other sorts of applications, and data. The storage 140 may store a payment application which performs payment such as a wallet. Further, the storage 140 may store the wish list. The wish list may be created according to the methods described in the various exemplary embodiments; however, the wish list may not be limited to herein.

The controller 130 may control general operation of the user terminal device 100 by using sorts of programs stored in the storage 140. The controller 130 may implement the sorts of programs according to user manipulation sensed by the sensor 120 and display implementation screen on the display 110.

Specifically, when a payment application is selected, the controller 130 implements the selected payment application and displays implementation screen thereof. Within the implementation screen of the payment application, various objects regarding credit cards or bank cards that a user has such as images, card names, card numbers, effective year-month-day, recognizing code such as bar code or QR code may be marked.

The nearfield wireless communicator 160 performs nearfield wireless communication. The nearfield wireless communicator 160 may perform nearfield wireless communication when the distance with an external device is within communication available range. For example of nearfield wireless communication (NFC) standard may be used. NFC standard is non-contact near distance wireless communication method using frequency bandwidth of 13.56 MHz. If NFC technology is used, when a plurality of terminals approach within near distance such as about 10 cm, data may be trans-received. Besides, wireless communication according to general RFID technologies may be performed. To perform nearfield wireless communication, tagging should be performed. Tagging indicates activities where at least one device is mounting a nearfield wireless communication tag and a device mounting a nearfield wireless communication reader approaches toward the other and positions within communication available range such that nearfield wireless communication can be performed. The nearfield wireless communicator 160 may include the nearfield wireless communication tag only; however, the nearfield wireless communicator may be implemented as one module integrating the nearfield wireless communication tag and reader.

The nearfield wireless communication tag may be constituted with integrated circuit (IC) and antenna coil. When an external device with the nearfield wireless reader is tagging, electrical currents are induced on the antenna coil within the nearfield wireless communication tag by electromagnetic waves emitted from the nearfield wireless communication reader. The induced currents are charged by a capacitor mounted within the nearfield wireless communication tag. IC is driven by currents charged by the capacitor, and generates RF signals by modulating and encoding prestored connecting information. The nearfield wireless communication tag may generate RF signals according to preset modulating technology and encoding method among various types of modulating technologies and coding methods. Modulating indicates technology which loads data by changing wavelength, frequency, and phase of RF carrier signals which are interchanged between the nearfield wireless communication tag and the nearfield wireless communication reader. When modulating, amplitude shift keying (ASK), frequency shift keying (FSK) and phase shift keying (PSK) technologies may be used. For coding methods, a modified Miller coding method and a Manchester coding method may be used. Modulating technology and a coding method used in the nearfield wireless communication tag may be properly established by considering device type and communication speed.

The nearfield wireless communication reader accesses the nearfield wireless communication tag and reads information, when nearfield wireless communication tagging performs. The nearfield wireless communication reader may be constituted with wireless frequency module and antenna coil. The nearfield wireless communication reader emits electronic wave through the antenna coil. Therefore, when RF signals including sorts of information are outputted from the nearfield wireless communication tag, the wireless frequency module within the nearfield wireless communication reader receives RF signals through the antenna coil. Information loaded in RF signals is extracted by performing jobs of demodulating and decoding the received RF signals. According to the exemplary embodiment, the nearfield wireless communication tag mounted in the nearfield wireless communicator 160 of the user terminal device may transmit sorts of payment information to an external device such as POS terminal, and the nearfield wireless communication reader mounted in the nearfield wireless communicator 160 may receive product information, a coupon information and an event information provided from an external device.

If the user terminal device of FIG. 15 is implemented as a simple type of a device which provides payment service according to nearfield wireless communication, the communicator may not be mounted. However, the user terminal device may be implemented to further include the communicator or other various units for general utilization. The composition of the user terminal device, which may include all of the additional units, will be explained with specific drawings in a later part of the specification.

The nearfield wireless communicator 160 may be used to provide payment service. Specifically, when tagging performs while payment program such as wallet is implemented, the nearfield wireless communicator 160 provides payment information to the tagged device, i.e., the host such as POS.

Figure 16:
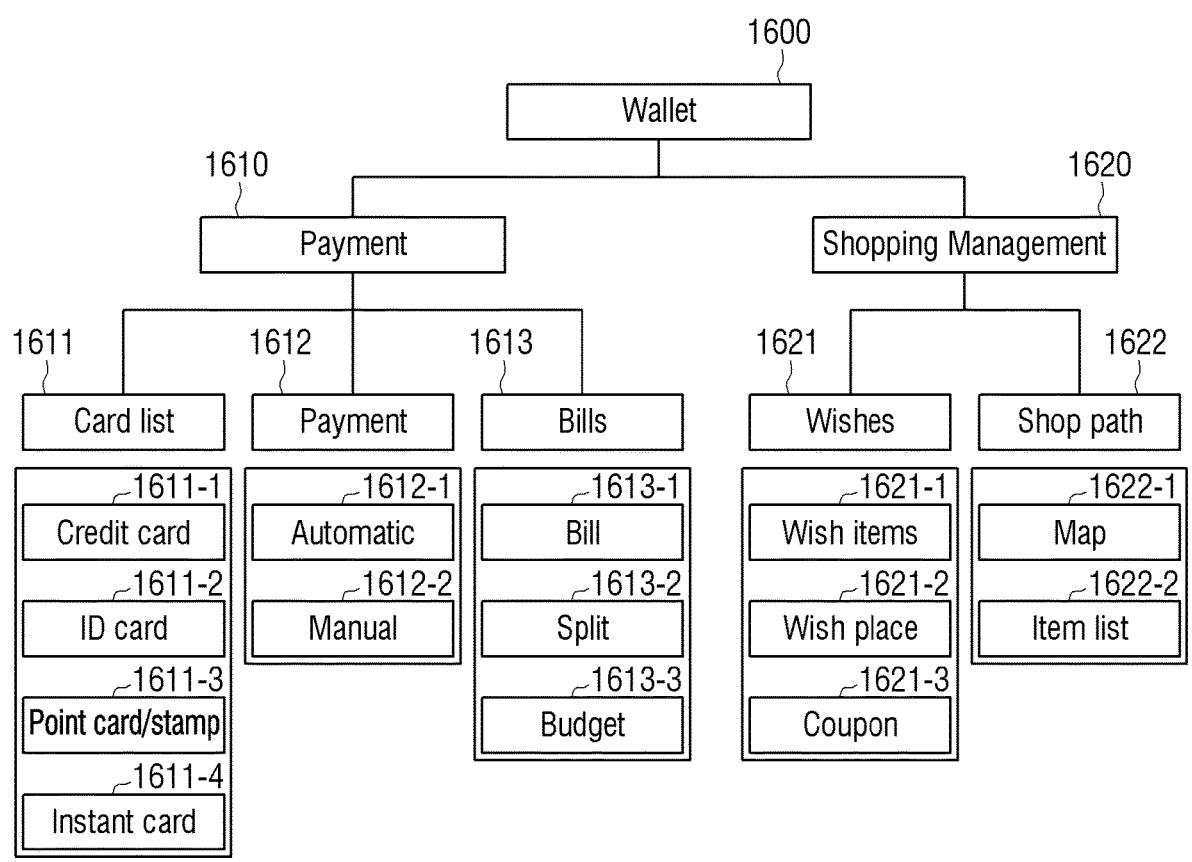
FIG. 16 illustrates an information architecture of a smart wallet program according to an exemplary embodiment.

FIG. 16 illustrates an example of information architecture regarding payment program. Referring to FIG. 16, wallet program 1600 may be divided into payment part 1610 which deals with price payment and shopping management part 1620. In the payment part 1610, information such as card list 1611, paid mode 1612 and receipt 1613 are managed. In the shopping management part 1620, information such as wishes 1621 and shop path 1622 are managed.

The card list 1611 includes various card information such as credit card information 1611-1, ID card information 1611-2, point card/stamp 1611-3 and instant card 1611-4. The receipt mode 1612 includes mode information such as automatic mode 1612-1 and passive mode 1612-1. Besides, the receipt 1613 includes information such as receipt message, allotted price, and installed price 1613-1~1613-3, the wish information 1621 includes information such as item to be purchased, purchasing place, and coupon 1621-1~1621-3, and the shop path information 1622 includes information such as map and item list 1622-1, 1622-2.

Figure 17:
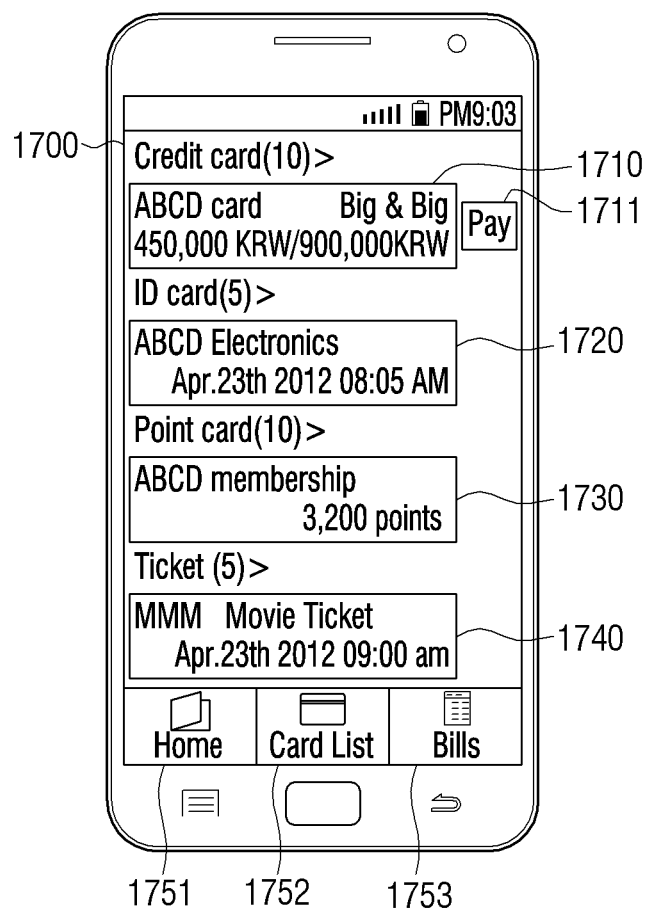
FIG. 17 illustrates an example of smart wallet screen according to an exemplary embodiment.

The controller 130 implements the wallet program 1600, manages and utilizes various information illustrated in FIG. 16. Specifically, when a product to be purchased is determined, a user selects icon of the wallet program 1600 and implements the wallet program 1600. Therefore, when the wallet program 1600 implements, the controller 130 displays the card list 1611 on the screen. FIG. 17 illustrates an example of screen regarding the card list 1611.

Referring to FIG. 17, screen 1700 displays credit card item 1710 registered in the wallet program 1600, ID card item 1720, point card item 1730, ticket item 1740, and sorts of menus 1751, 1752, and 1753. The credit card item 1710 displays the number of registered credit cards (e.g., 10 credit cards), information of the credit card most frequently used or registered as default, and other information.

FIG. 17 illustrates an example of smart wallet screen according to an exemplary embodiment. FIG. 17 illustrates that card type, card name, and paid price are marked. When the credit card item 1710 is tapped, the controller 130 displays list of registered credit cards. Further, the credit card item 1710 may mark pay button 1711. The pay button 1711 is button which performs payment directly by using credit cards marked on the credit card item 1711. When a user pushes the pay button 1711, the controller 130 displays PIN input screen regarding the marked credit cards on the display 110.

The ID card item 1720 may be also displayed by the method of displaying the credit card item 1710. The point card item 1730 is an item regarding card with which points can be saved similar to different sorts of point cards, mileage cards, and stamps. The ticket item 1740 is item regarding card information for one time usage such as entrance tickets, parking lot tickets, and gift certificates.

Among the menus, the home menu 1751 is menu that can go back to main screen among screens of the wallet program. The card list menu 1752 is menu that arranges registered card information as list format, and the receipt menu 1753 is menu that displays information related with consumption such as purchasing records of a user (electronic receipts and short message service (SMS) card payment information).

A user selects a card to be used on the implementation screen of the wallet program described above, and tags the user terminal device regarding the external host. In this case, the nearfield wireless communicator 160 performs payment by transmitting authentication information corresponding to the selected card.

The controller 130 processes directly payment according to the above method when a payment try is performed regarding a product unregistered on the wish list. Meanwhile, when a payment try is performed regarding a product registered on the wish list, the controller 130 performs informing by comparing with the registered information on the wish list.

Specifically, when a payment try is performed by using nearfield wireless communication while the wish list is stored in the storage 140, the controller 130 determines whether the product to be paid is registered on the wish list or not. As a determining result, if the product to be paid is registered, the controller 130 determines whether the price to be paid is lowest price registered on the wish list. The controller 130 displays the determining results on the display 110.

Standard to determine similarity may be texts. For example, when the product name is received from the host while trying payment, the controller 130 may determine whether a product name registered on the wish list is partly or totally same as the received product name. Further, when ID and category of the product are provided through bar code or QR code, the controller 130 determines whether information having the same ID and category is stored on the wish list or not. Further, when manufacture registered number or manufacturing category is provided, the controller 130 may determine whether corresponding information or upper category information are stored on the wish list.

The controller 130 may output a message to inform the fact when product information having a lower price than the price to be paid is stored on the wish list or a product having more recent manufacturing data or version than the product to be paid is stored on the wish list. Further, when there are packaging items including the product to be paid, suggested products, or event products, the controller 130 may output informing message.

Figure 18:
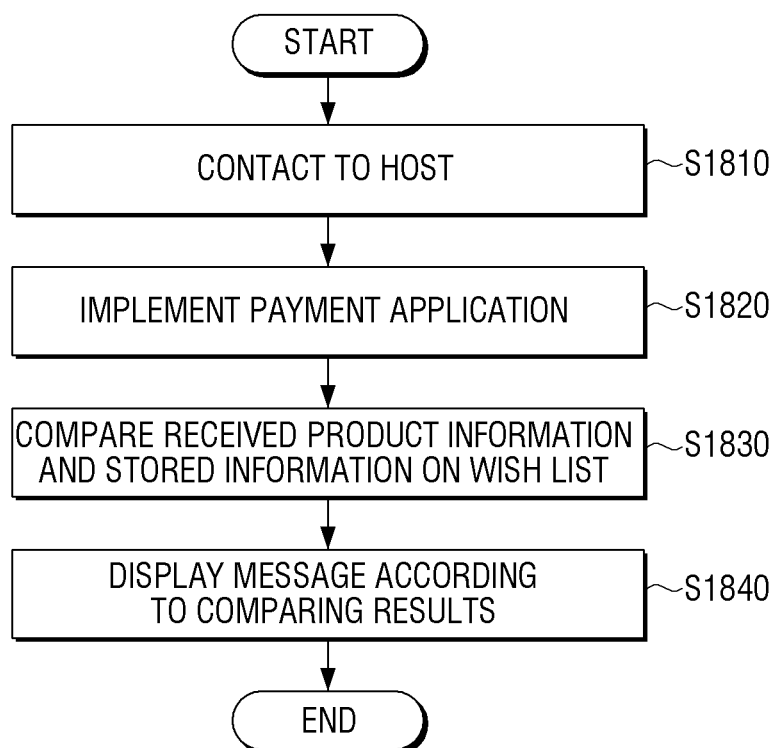
FIG. 18 is a flowchart illustrating a method of providing a shopping service at the user terminal device of FIG. 15 according to an exemplary embodiment.

FIG. 18 is a flowchart illustrating a method of providing shopping service according to another exemplary embodiment. Referring to FIG. 18, when the user terminal device contacts the host at S1810, the payment application implements at S1820. In the automatic mode, the payment application may automatically implement; however, in the passive mode, the payment application may implement when a user directly selects icon of the payment application.

The user terminal device may receive product information according to nearfield wireless communication methods when contacting the host. The user terminal device compares the received product information with the stored information on the wish list at S1830 and displays a message according to the comparing results at S1840.

Figure 19:
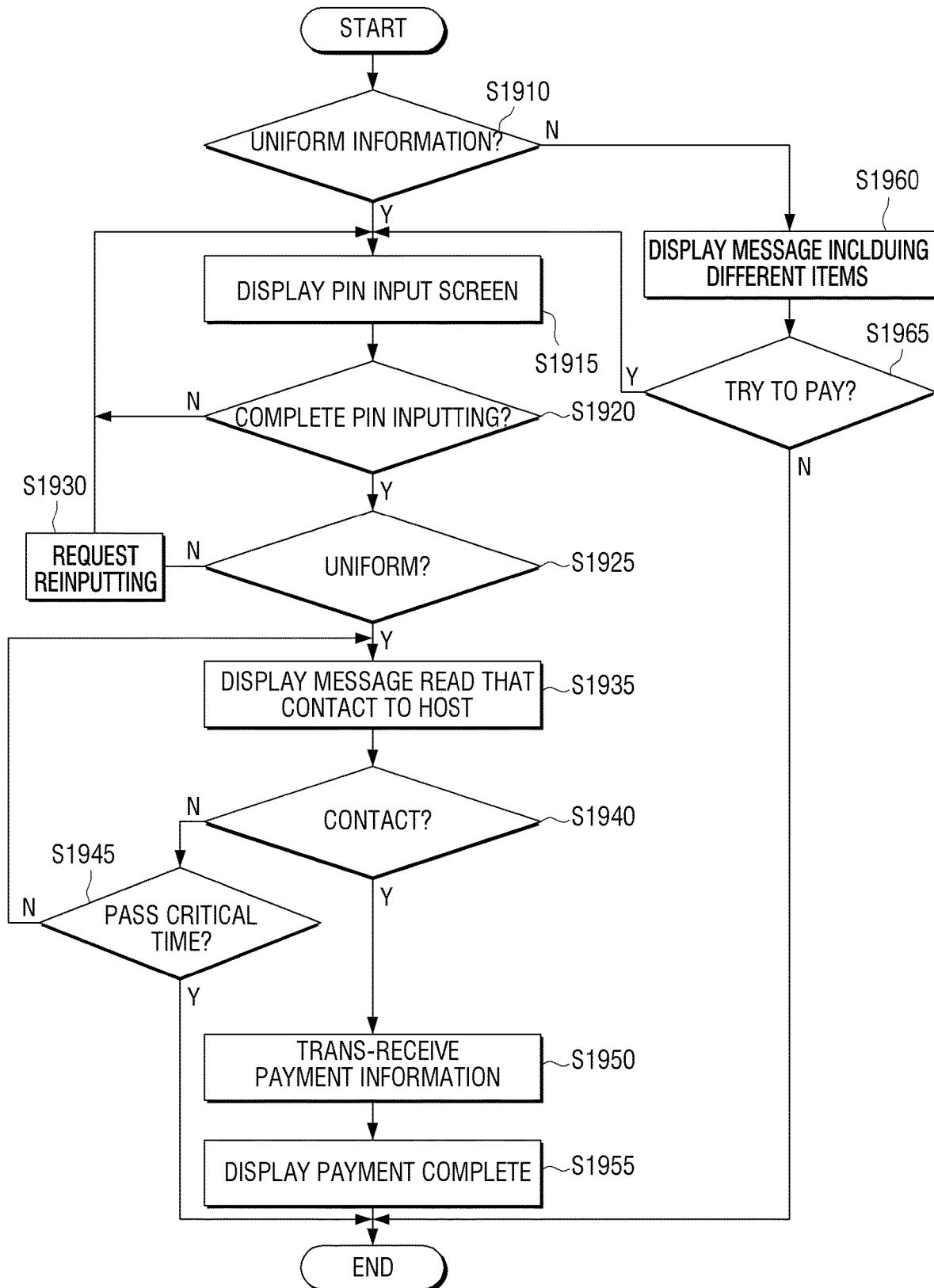
FIG. 19 is a flowchart illustrating a payment method of implementing payment through a process of comparing with a wish list according to an exemplary embodiment.

FIG. 19 is a flowchart illustrating a payment process of the user terminal device. Specifically, FIG. 19 describes a follow-up process when information of the product to be paid is stored on the wish list.

The user terminal device compares information of the product to be purchased with the stored information on the wish list. As comparing results, if information is not uniform at S1910:N, the user terminal device displays a message including different items. For example, if the price of the product to be paid is lower than the price of the same product registered on the wish list, the user terminal device displays a message informing a shopping mall which sells the product at a lower price to a user at S1960. Further, if manufacturing date of the product registered on the wish list is more recent or newest version; the user terminal device may display a message informing this fact.

A user may confirm the message and determine whether to stop or go on his action to pay at S1965. When a user stops action to pay and tries to pay the registered product on the wish list, he may display the wish list on the screen, select the product and access the server which sells corresponding product. The shopping service method of using the wish list is specifically described in the above exemplary embodiments, which will not be further described.

Meanwhile, if sorts of information regarding the product to be purchased are the same as those of the product registered on the wish list at S1910, the user terminal device processes payment. Specifically, the user terminal device displays a PIN input screen at S1915. Information about the product to be paid may be provided from the host according to nearfield wireless communication method; however, the information about the product may be provided through other communication methods. For example, while product information is provided from the server which provides shopping screen such as web server or other external devices, only the payment process may be performed through the host.

A user inputs his password on PIN input screen. If password inputting completes at S1920, the user terminal device confirms agreement at S1925. After confirming, if there is disagreement, the user terminal device requests reinputting at S1930. If there is agreement, the user terminal device displays a message informing a process of contacting the host at S1935. If a user considers the message, moves and contacts the user terminal device to the host at S1940, the user terminal device and the host trans-receive payment information at S1950. Therefore, payment completes, and the user terminal device informs a user of the fact that payment completes through the screen at S1955. Meanwhile, if contacting the host is not performed for established critical time after confirming agreement of the password at S1940, S1945, the user terminal device completes the payment process.

Figure 20:
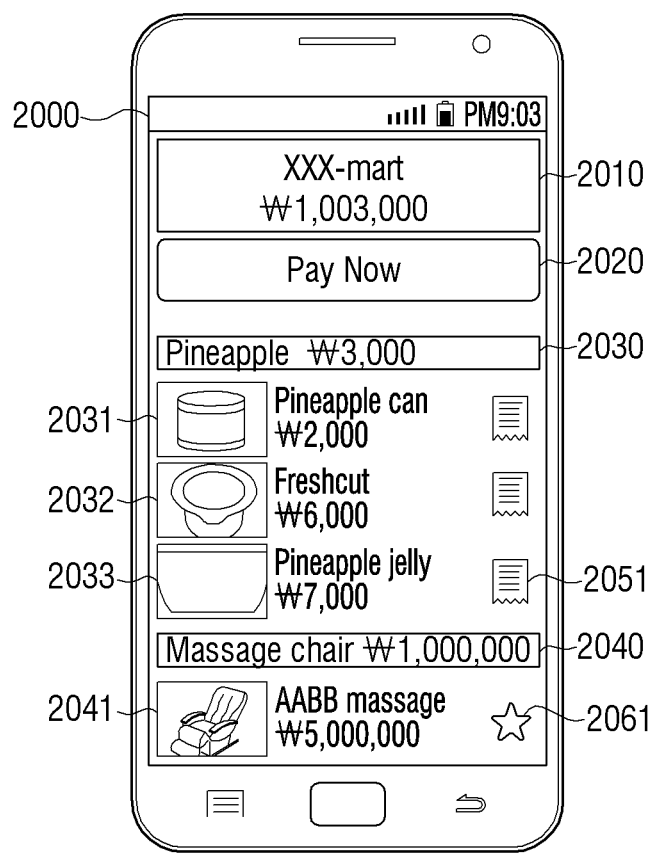
FIG. 20 illustrates an example of a payment screen according to an exemplary embodiment.

FIG. 20 illustrates an example of payment screen created by comparing with prestored information. Referring to FIG. 20, payment screen 2000 may mark area of total price to be paid 2010, confirm button to request payment 2020, information of item to be purchased 2030, 2040, and information regarding similar items with the product to be purchased among the previous buying products or the products registered on the wish list 2031, 2032, 2033, 2041.

The similar item information 2031, 2032, 2033, and 2041 may mark icons 2051, 2061 with product images, names, and prices. For example, in FIG. 20, the icon 2051 in list format indicates information of similar items in the previous buying products, and the icon 2061 in star format indicates information of similar items registered on the wish list.

The controller 130 may differently express colors of the item 2031 having lower price than that of the product to be purchased currently and colors of the items 2032, 2033, 2041 having higher price than that of the product to be purchased currently. For example, the similar item 2031 having lower price may be expressed as red color and similar items 2032, 2033, 2041 having higher price may be expressed as blue color.

Figure 21:
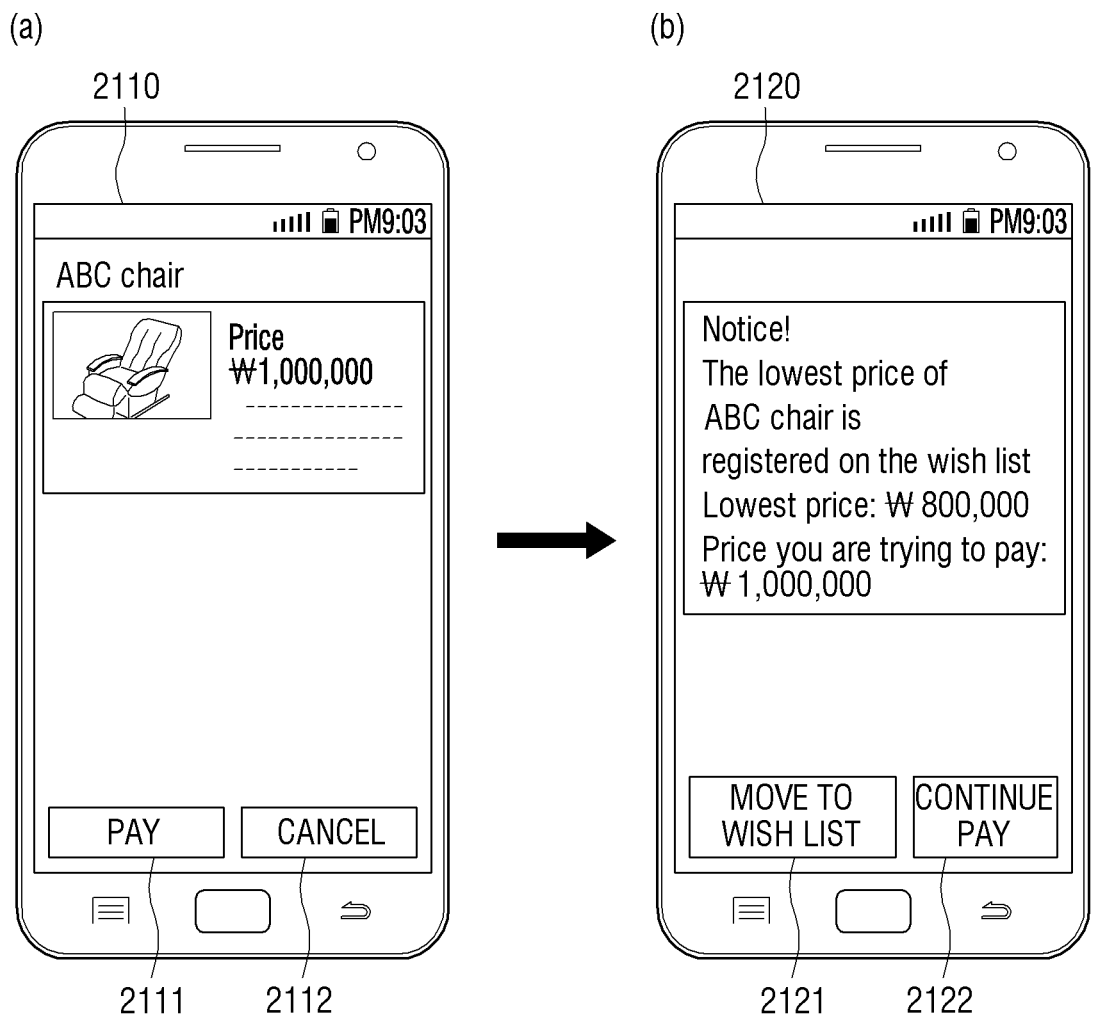
FIG. 21 illustrates an example of an informing message according to the results of comparing a wish list and payment information according to an exemplary embodiment.

FIG. 21 illustrates a composition of informing message according to another exemplary embodiment. Referring to (a) of FIG. 21, payment screen 2110 may mark menu buttons 2111, 2112 with sorts of information regarding the product. When a user selects the payment button 2111, the controller 130 determines whether the same or similar product with the marked product is registered on the wish list. As determining results, if the same or similar product is registered, the controller 130 displays informing message 2120 as illustrated in (b) of FIG. 21. The informing message may mark texts or images informing that the product having a lower price regarding corresponding product is registered on the wish list. With the informing message 2120, first menu 2121 requesting going to the wish list and second menu 2122 requesting going on payment of the product to be purchased. When a user selects the first menu 2121, the controller 130 reads and displays the wish list stored in the storage 140 on the screen. Meanwhile, when the second menu 2122 is selected, the controller 130 deletes the informing message 2120 and goes on the payment process.

The payment process may be performed according to various methods in the previously established mode regarding the payment application.

Figure 22:
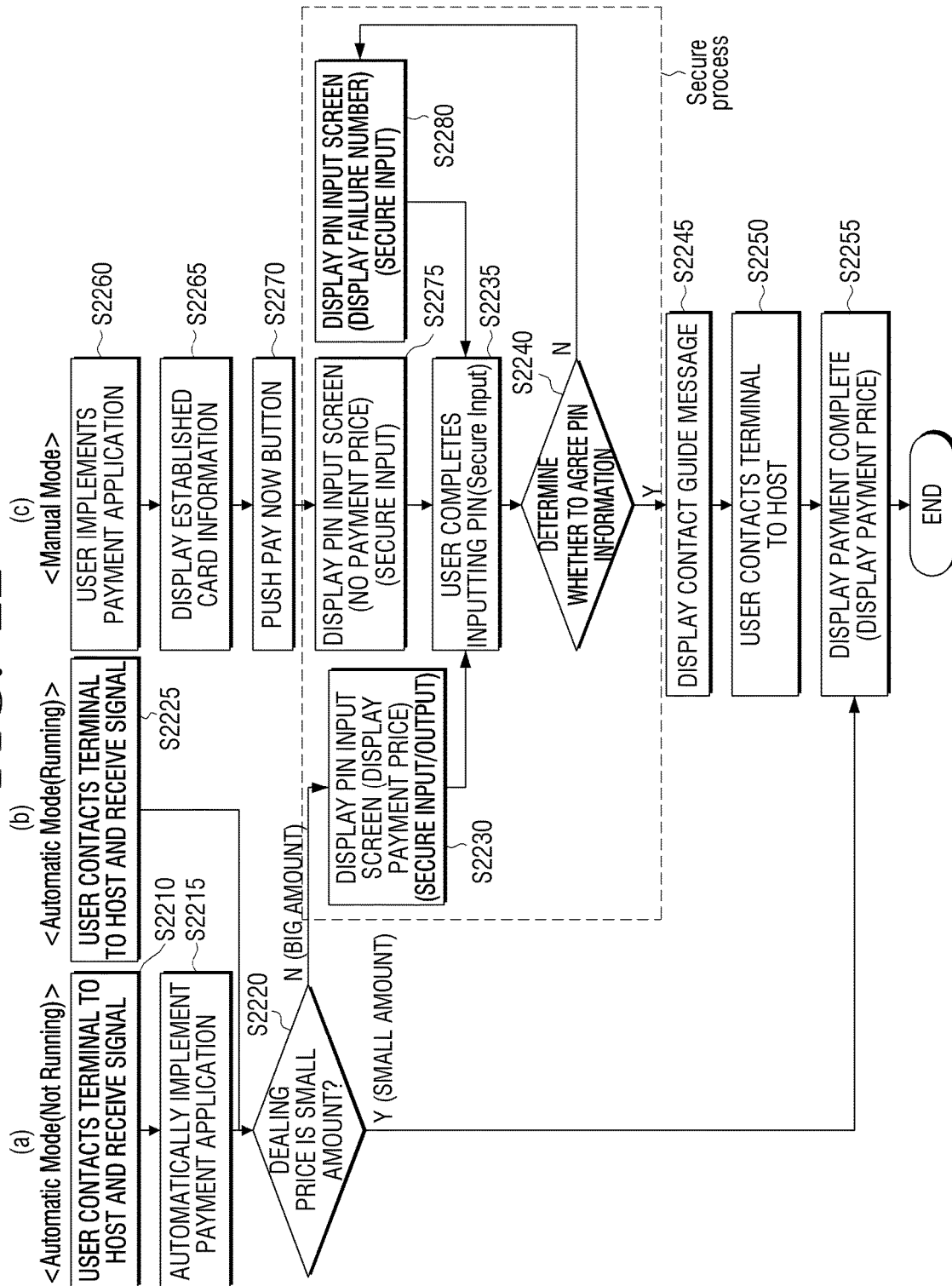
FIG. 22 is a flowchart illustrating a payment process according to modes in accordance with an exemplary embodiment.

FIG. 22 is a flowchart illustrating a payment process according to modes in accordance with an exemplary embodiment. Referring to FIG. 22, payment mode is divided into automatic mode and passive mode. When the payment application does not implement while establishing the automatic mode (a), a user contacts the user terminal device to the host. By contacting, sorts of signals may be trans-received according to nearfield wireless communication methods at S2210. When signals are received, the user terminal device automatically implements the payment application at S2215. When the payment application implements, the user terminal device determines whether the dealing price is small amount or not.

Meanwhile, when the payment application already implements while establishing the automatic mode (b), if a user contacts the user terminal device to the host at S2225, a process of determining whether the dealing price is small amount may be performed without automatically implementing the payment application at S2220. Standard price to determine the small amount may be voluntarily established. For example, if \300,000 is established as standard price, the user terminal device performs payment regarding the dealing price lower than \300,000 and displays that payment completes at S2255.

Meanwhile, if the dealing price is higher than \300,000, the user terminal device displays a PIN input screen at S2230. If a user completes inputting the user password on the PIN input screen at S2235, the user terminal device determines whether the password can be agreed to at S2240. As determining results, if the password is not agreed, the user terminal device displays the PIN input screen again at S2280. At this operation, the number of failures may be displayed. Meanwhile, if the password is agreed to, the user terminal device displays a message informing that the host can be contacted to S2245. In this situation, when a user contacts the host with the user terminal device at S2250, the user terminal device trans-receives sorts of information for payment, performs payment, and displays that payment completes at S2255. When payment completes, only the price which is already paid can be displayed. If additional information needs to be marked, the user terminal device may move to the screen where a user can directly input. Further, when a user pushes the confirm button after completing payment, the user terminal device may move to main screen.

Meanwhile, when the passive mode is established (c), a user should select and implement the icon of the payment application. When a user implements the payment application at S2260, the user terminal device displays the established card information at S2265. In this situation, when a user pushes the payment implementing button at S2270, displaying PIN input screen is performed at S2275. Following operation is already described above, which will not be further explained.

Authenticating a user with PIN input screen may be processed with security. For example, the user terminal device may encrypt the password inputted by a user with random encryption algorithms and provide to the host.

According to the above exemplary embodiments, a user can confirm the item to be purchased before payment. Specifically, by comparing information registered on the wish list with information regarding the item to be purchased, a user can encourage reasonable consumption.

Meanwhile, the above exemplary embodiments can be implemented together with the various exemplary embodiments described in FIGS. 6 to 14, or separately with them. Thus, information regarding the product to be purchased may be provided based on the wish list created and updated in the exemplary embodiments described in FIGS. 6 to 14.

If payment completes after selecting the item, purchasing record is created. The shopping system including the user terminal device and the server may provide various additional services by using the purchasing record. The following will explain various exemplary embodiments which provide various services by using the purchasing record of a user.

In the shopping system, an electronic receipt is issued after shopping is performed. In the shopping system according to another exemplary embodiment, additional service information may be provided to the electronic receipt by using purchasing record of a user.

The electronic receipt may be issued in the host which performs wireless payment with the user terminal device.

Figure 23:
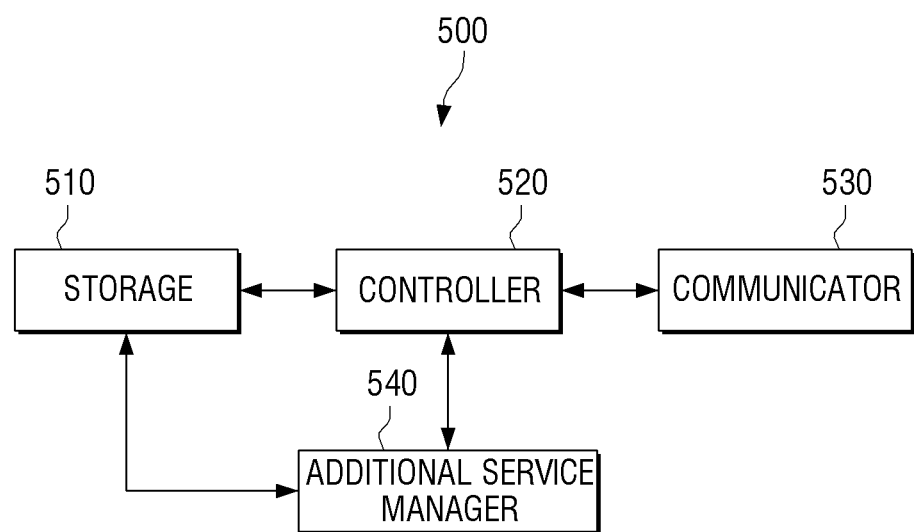
FIG. 23 is a block diagram of a host at a shopping system according to an exemplary embodiment.

FIG. 23 is a block diagram of the host according to an exemplary embodiment. Referring to FIG. 23, the host 500 includes a storage 510, a controller 520, a communicator 530, and an additional service manager 540. The host 500 may be implemented as POS system.

The storage, or memory, 510 stores different types of information. Specifically, information such as customer information and purchasing records may be stored.

The communicator 530 receives a request of payment from the user terminal device. In this case, the user terminal device may be device including composition described in the above exemplary embodiments; however, the user terminal device may not be limited to herein. Alternatively, the user terminal device may be a user terminal device that includes a general composition.

The communicator 530 may include at least one of various communication module such as NFC chip, bar code reader, QR code reader, card reader, and WiFi chip.

The additional service manager 540 may determine additional service information provided to users by using stored information in the storage 510. Additional service information may be coupon information, event information and stamp coupon information.

When the payment request is received through the communicator 530, the controller 520 processes payment for the user terminal device.

Specifically, if information of payment tools (e.g., card number, password, card efficient date information and resident registration number) is received from the user terminal device, the controller 520 transmits the received information to the payment server managed by card companies or banks. Therefore, the electronic receipt which payment price, payment date, user name, and payment place are written is created. The controller 520 modifies the electronic receipt by adding additional service information to the created electronic receipt. The controller 520 issues the modified electronic receipt through the communicator 530 to the user terminal device.

The controller 520 stores the inputted information in the storage 510 if information of new customers is inputted. The storage 510 stores various information which manages customer-related service.

Figure 24:
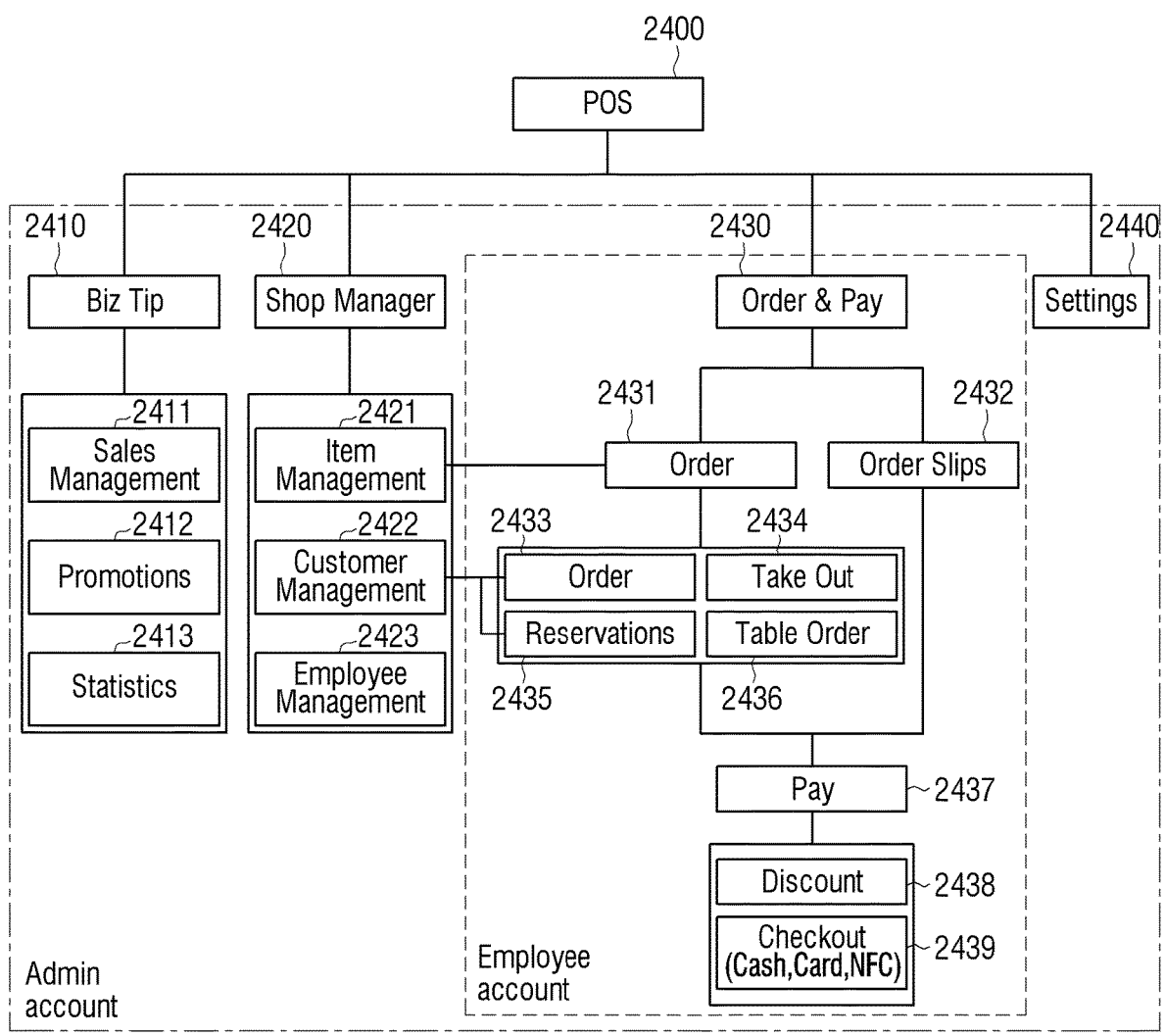
FIG. 24 illustrates exemplary information architecture of a host according to an exemplary embodiment.

FIG. 24 illustrates information architecture stored in the host. Referring to FIG. 24, POS information 2400 includes various information such as Biz tip 2410, shop manager 2420, order & pay 2430, and setting 2440.

Biz tip 2410 may include sale managing information 2411, promotion information 2412, and statistics information 2413. The shop manager 2420 includes item managing information 2421, customer managing information 2422, and clerk managing information 2423.

The customer managing information 2422 may include information regarding names, addresses, purchasing items, and other special points of customers who have previous dealing records.

The order & pay information 2430 is divided into order 2431, order slip 2432, and payment 2437. The order information 2431 may include various ordering facts such as delivery 2433, packaging 2434, reserving 2435, and table ordering 2436. The payment 2437 may store information such as discount 2438 and calculate 2439.

As illustrated in FIG. 24, the order & pay information 2430 may be accessed by clerk accounts; however, access authority may be limited so that other information can be accessed only by manager accounts.

A manager may input individual information or dealing record regarding the customers by using a display and a keyboard (not illustrated) mounted on the host 500 if trading is performed with new customers. When corresponding company tries to issue coupons or implement events, such information may be inputted in the host 500. The controller 520 manages database of the storage 510 by using the inputted information. Further, the controller 520 may update database by using customer information and payment record received through the communicator 530 if trading is performed with old customers who have previous trading.

Figure 25:
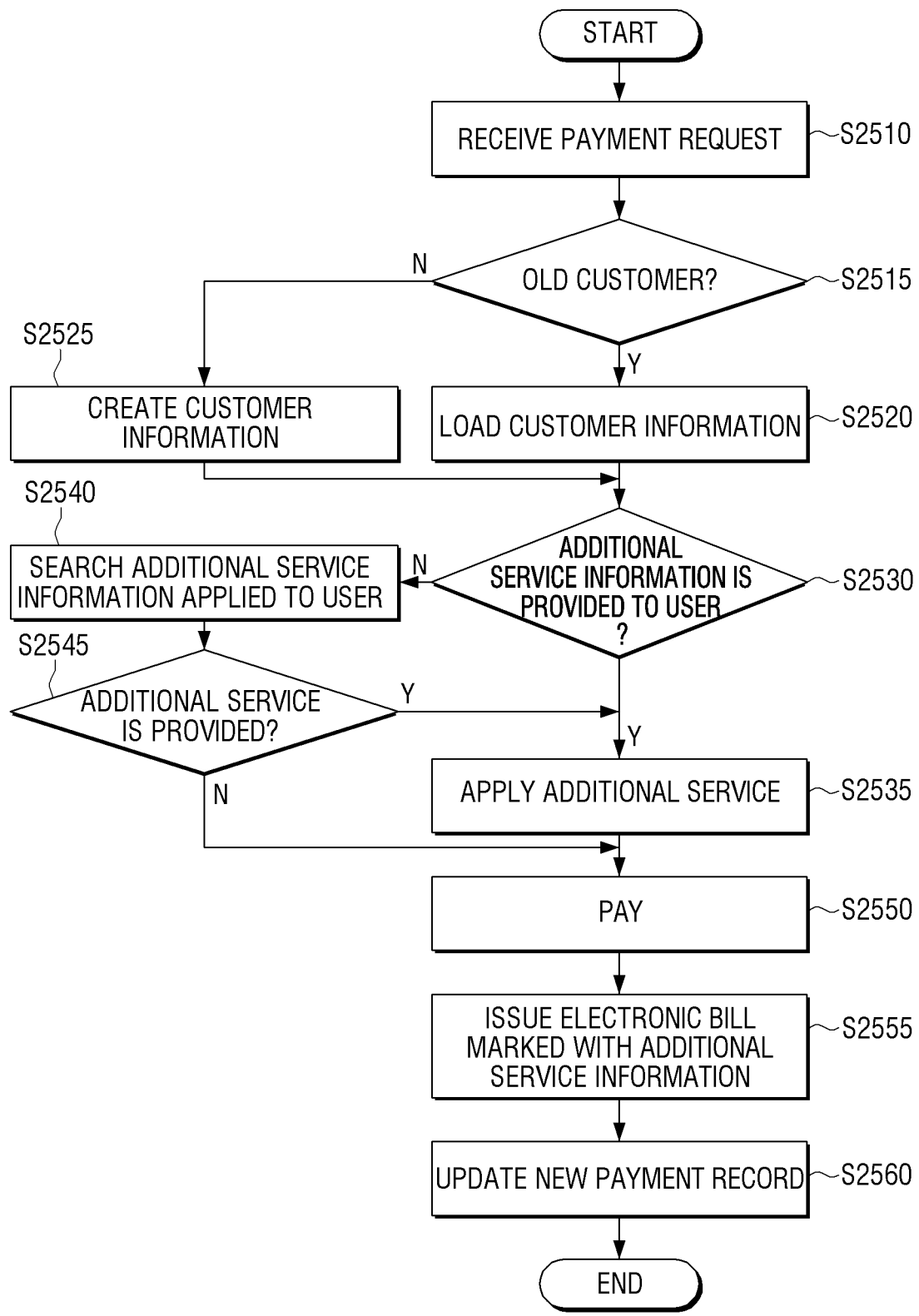
FIG. 25 is a flowchart illustrating a method of providing service at a host according to an exemplary embodiment.

FIG. 25 is a flowchart explaining a method of managing purchasing record according to an exemplary embodiment. Referring to FIG. 25, when the payment request is received at S2510, the host confirms whether a customer trying to trade is an existing customer or a new customer at S2515.

As confirming results, if he is an existing customer, the host loads customer information at S2520. Meanwhile, if he is a new customer, the host newly creates customer information at S2525.

At S2530, the host determines whether there is previously allocated additional service information regarding the user terminal device. Additional service information may be coupon information, stamp information and event information. For example, the shopping system may provide discount coupon, free item providing coupon, stamp coupon which provides specific benefits if purchasing is performed more than determined times, and event which provides discount or free items if specific time or condition is met or issues gift certificates to encourage purchasing intention of users. Thus, various services additionally provided with purchasing activity are additional services in this specification, and information used in these services is additional service information. When the user terminal device already stores previously issued coupons, the host may examine additional service information such as coupon stored in the user terminal device. Further, additional service information may be stored in the host.

When additional service information is already issued, the host may calculate payment price by applying the additional service information at S2535.

Meanwhile, if there is no additional service information provided to a user, the host may search additional service information that can be provided to a user in the server, other social network services, and web sites at S2540. Specifically, regarding new customers, customers who pay with specific credit cards, and customers who have specific qualifications (e.g., clerks or members), commerce companies may provide additional service such as discount or free gift. The host may search additional services that can be provided to corresponding customers based on the customer information obtained from the user terminal device. Therefore, when additional services are searched at S2545, the searched additional services are applied at S2535.

The host performs payment with the price applied with the additional services at S2550. For example, if the additional service is discounting, the host performs payment with the discounted price. Meanwhile, if the additional service is using free coupon, the host may perform payment with the price of \0. Further, if the additional service is stamp coupon, the host additionally issues stamps by new purchasing to the previously accumulated stamps. For example, if a customer is issued with stamp coupon which provides one time free service on the condition of fifth purchasing, and if the record reads as three previous purchasing, the host issues fourth stamp. Further, if the record reads as four previous purchasing, the host performs payment by substituting the price with free.

The host issues the electronic receipt which marks the additional service information at S2555 when payment completes. The additional service information may include various information such as coupon using records, accumulated stamp coupon records, discount prices, discount rates, whether to use discount coupon, number of available coupons, and types of used coupons. The electronic receipt may be transmitted to the user terminal device. The host updates database based on new payment record at S2560 when issuing the electronic receipt completes. If stamp coupon is issued, the host additionally issues stamp and updates corresponding customer information by adding various information such as purchasing number, purchasing price, and purchasing item. Although FIG. 25 describes that the electronic receipt is issued after payment completes, the electronic receipt added with the additional service information may be issued before payment and payment may be processed when a user approves payment regarding the issued electronic receipt. The electronic receipt before payment performs may be differently called as purchasing slip.

Figure 26:
FIGS. 26 and 27 illustrate examples of screen composition which display additional service information according to an exemplary embodiment.
Figure 27:
Figure 28:
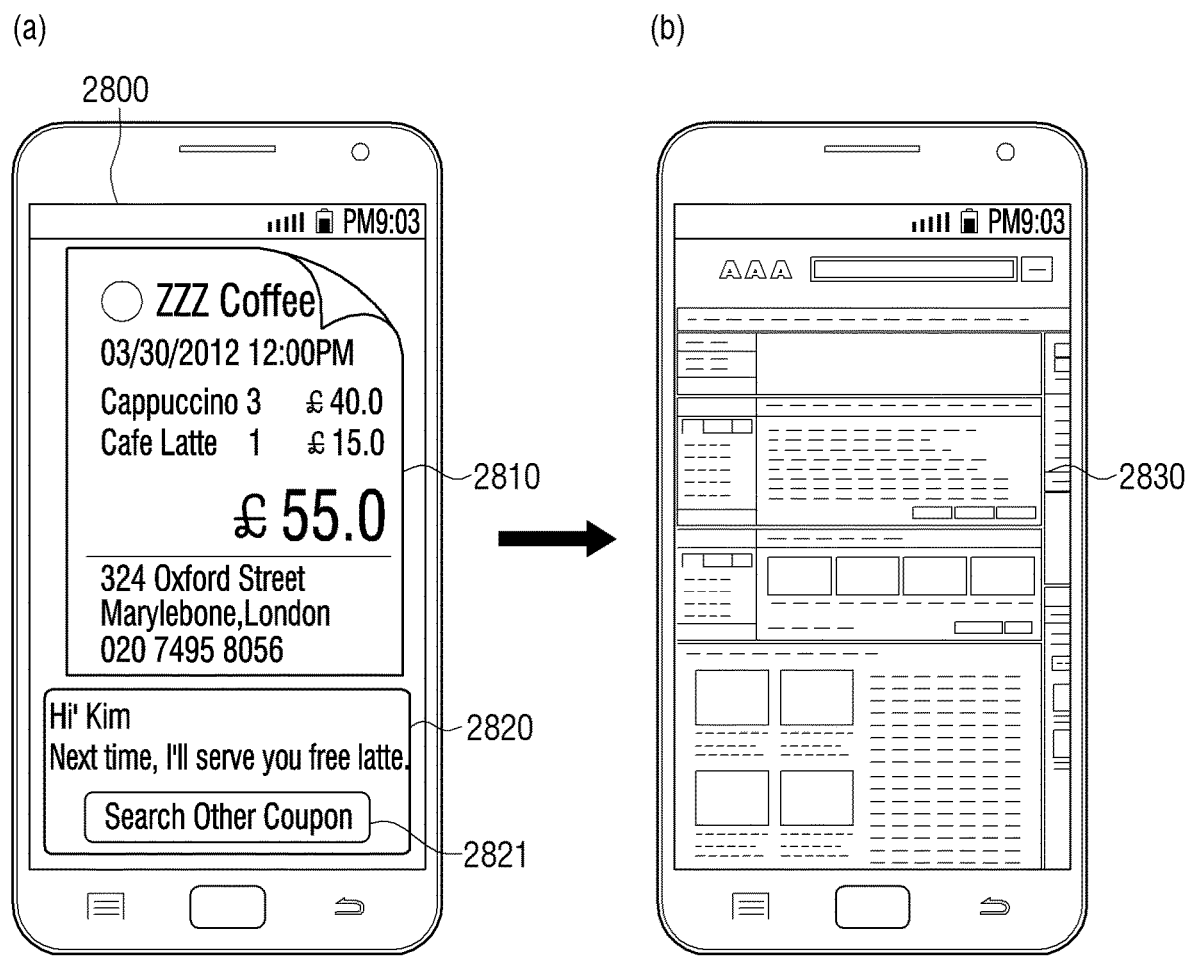
FIG. 28 is a diagram illustrating an exemplary embodiment of searching additional service information that can be used.

FIGS. 26 to 28 illustrate various examples of screen composition which displays additional service information.

FIG. 26 illustrates screen informing available coupons before inputting PIN for payment. Referring to FIG. 26, payment screen 2600 marks coupon information 2620 that a user owns as well as information regarding the product to be purchased 2610. The coupon information 2620 may be already stored in the user terminal device, or may be provided from the host or other external devices at the operation of selecting and paying the product. The information regarding the product 2610 may include manufacturer name, product name, price, manufacturer address and purchasing date. In FIG. 26, when a user selects the coupon information 2620, the selected coupon information 2620 is applied Like an example of FIG. 26, if three cups of cappuccino and one cup of café latte are ordered and free coupon for one café latte is used, only prices of three cappuccino are paid. If the payment application such as wallet is installed, the payment application automatically implements and payment performs when the coupon information 2620 is selected. Specifically, in the screen of FIG. 26, when a user selects the coupon information 2620 or selects the product information 2610, the screen converts to implementation screen of the payment application. The implementation screen may be displayed as a composition described in FIG. 17; however, it may not be limited to herein. Other various compositions may be displayed as implementing screen.

FIG. 27 illustrates an example of the electronic receipt which stamp coupon is issued. Referring to FIG. 27, electronic receipt screen 2700 marks stamp coupon 2720 as well as product information 2710. In the stamp coupon 2720, stamp 2721 corresponding to purchasing number, purchasing amount or purchasing price is accumulated and marked. The host determines the number of issued stamps by considering purchasing number, purchasing amount or purchasing price of a user, and displays the stamp coupon 2720 by adding the determined number of stamps to the previous stamps. Therefore, when the determined number of accumulated stamps is counted, the host may convert to available coupon and display as illustrated in FIG. 26.

FIG. 28 illustrates screen according to an exemplary embodiment which searches available additional service information. Referring to (a) of FIG. 28, electronic receipt screen 2800 marks additional service information 2820 as well as product information 2810. The additional service information 2820 may additionally mark search menu 2821. When a user selects the search menu 2821, the user terminal device transmits a searching request to the host or other external devices. The host or other external devices search available additional service information that a user can use and transmit the searching results to the user terminal device according to the searching request. Searching may be performed based on purchasing item or shop information. Referring to (b) of FIG. 28, an example of screen which displays the searching results is illustrated.

Although (b) of FIG. 28 illustrates web searching screen as example, site screen provided from specific server can be illustrated. In this case, available coupon that a user can use or event information may be provided in list format.

When additional service information is searched as illustrated in (b) of FIG. 28, a user may select one of the searching results. For example, when a user selects the searched coupon item, he may access the server which provides corresponding coupon and download the coupon. Therefore, the additional service information 2820 in the payment screen of (a) of FIG. 28 may be substituted with coupon information.

Besides, additional service information may be obtained according to various methods.

Figure 29:
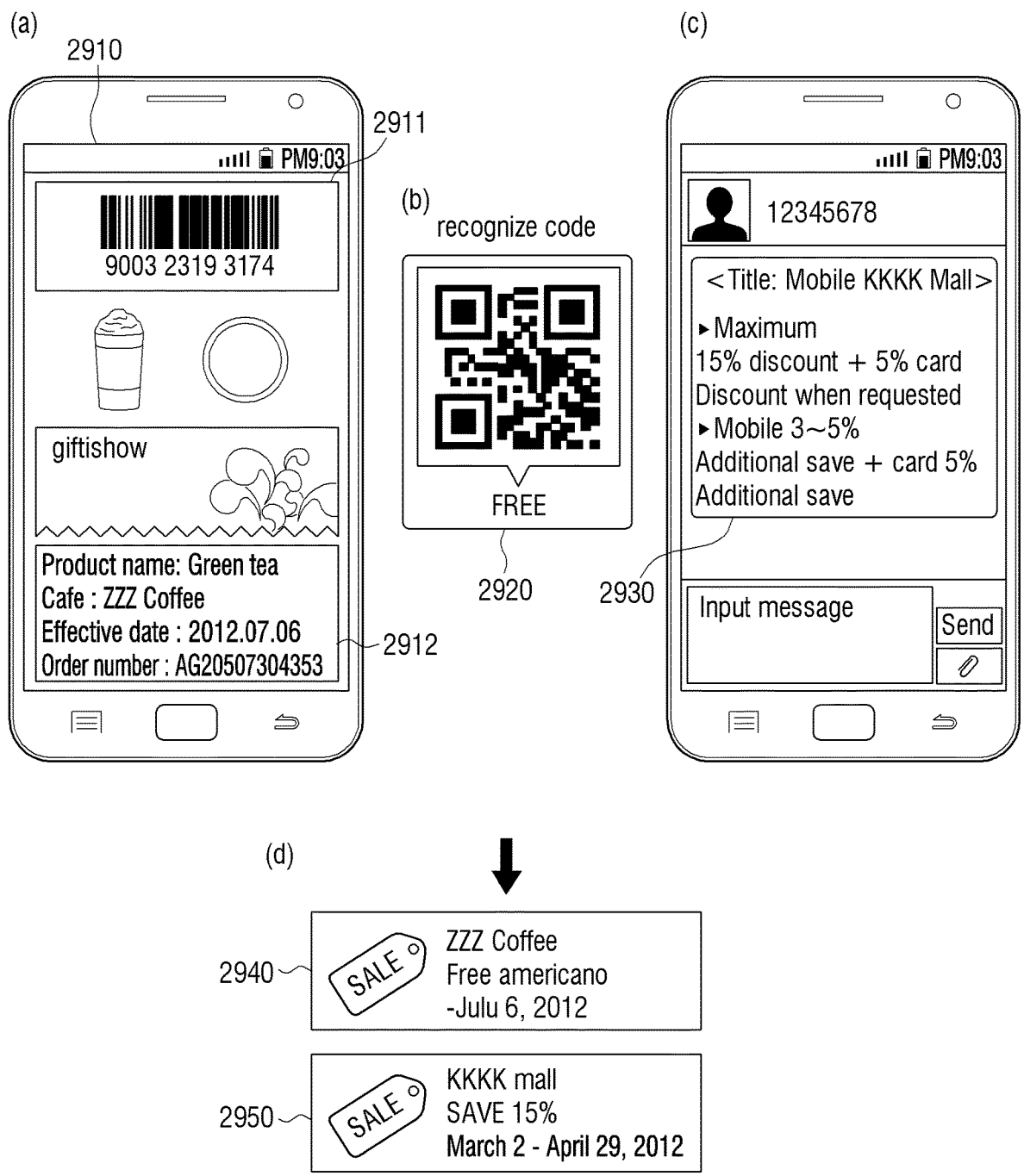
FIG. 29 is a diagram illustrating various methods of receiving additional service according to an exemplary embodiment.

FIG. 29 is a diagram illustrating various methods of obtaining additional service information in the user terminal device. Referring to (a) of FIG. 29, coupon screen 2910 which is received through an electronic mail is illustrated. Referring to (a) of FIG. 29, the coupon screen 2910 may mark bar code 2911 and text information 2912. When the bar code 2911 marked on the screen of the user terminal device is read by the bar code reader of the host, corresponding coupon is automatically applied and the price to be paid may be discounted. Further, the coupon screen 2910 may mark texts such as product name, coupon using shop, effective period, and order number together. When a user touches the coupon screen 2910, the user terminal device may extract texts 2912 marked within the coupon screen 2910, generate coupon data, and store the data in the storage. Referring to (d) of FIG. 29, an example of coupon data is illustrated. The user terminal device may search the stored coupon data, directly modify to the available format, and store the modified coupon data when requesting payment. The coupon data of (d) of FIG. 29 may be stored within the user terminal device; however, the coupon data may be stored within the host or other external servers.

Meanwhile, the user terminal device may read bar code or QR code externally, and obtain coupon data. For example, when a camera is mounted on the user terminal device, QR code illustrated in (b) of FIG. 29 may be read by using the camera. Thereby, data corresponding to the code may be extracted, relevant images may be added, and the coupon data of (d) of FIG. 29 may be stored.

Further, the user terminal device may receive additional service information through short message service (SMS), multimedia message service (MMS), or mobile messenger. Referring to (c) of FIG. 29, coupon information 2930 received through MMS is illustrated. When a user selects the coupon information 2930, coupon data 2950 corresponding to the coupon information is generated and stored.

Thus, additional service information may be provided in various methods and various formats.

Figure 30:
FIG. 30 illustrates an electronic receipt with additional service information according to an exemplary embodiment.

FIG. 30 illustrates another composition of an electronic receipt on a screen with additional service information being provided. Referring to FIG. 30, an electronic receipt 3000 marks stamp coupon 3020 with product information 3010. Within the stamp coupon 3020, stamps 3021, 3022, 3023, 3024 issued according to purchasing record of a user may be marked. In FIG. 30, figures of the stamps 3021, 3022, 3023, 3024 are differently marked according to purchased products. Stamp figure may be expressed in simple uniform image illustrated in FIG. 27, or in separate images created by considering purchasing records as illustrated in FIG. 30. Besides, texts indicating purchased product name or purchasing data may be marked as stamp.

The above exemplary embodiments describe that the electronic receipt marked with additional service information is provided while purchasing is processing; however, additional service information may be provided separately from issuing the electronic receipt in another situation.

Figure 31:
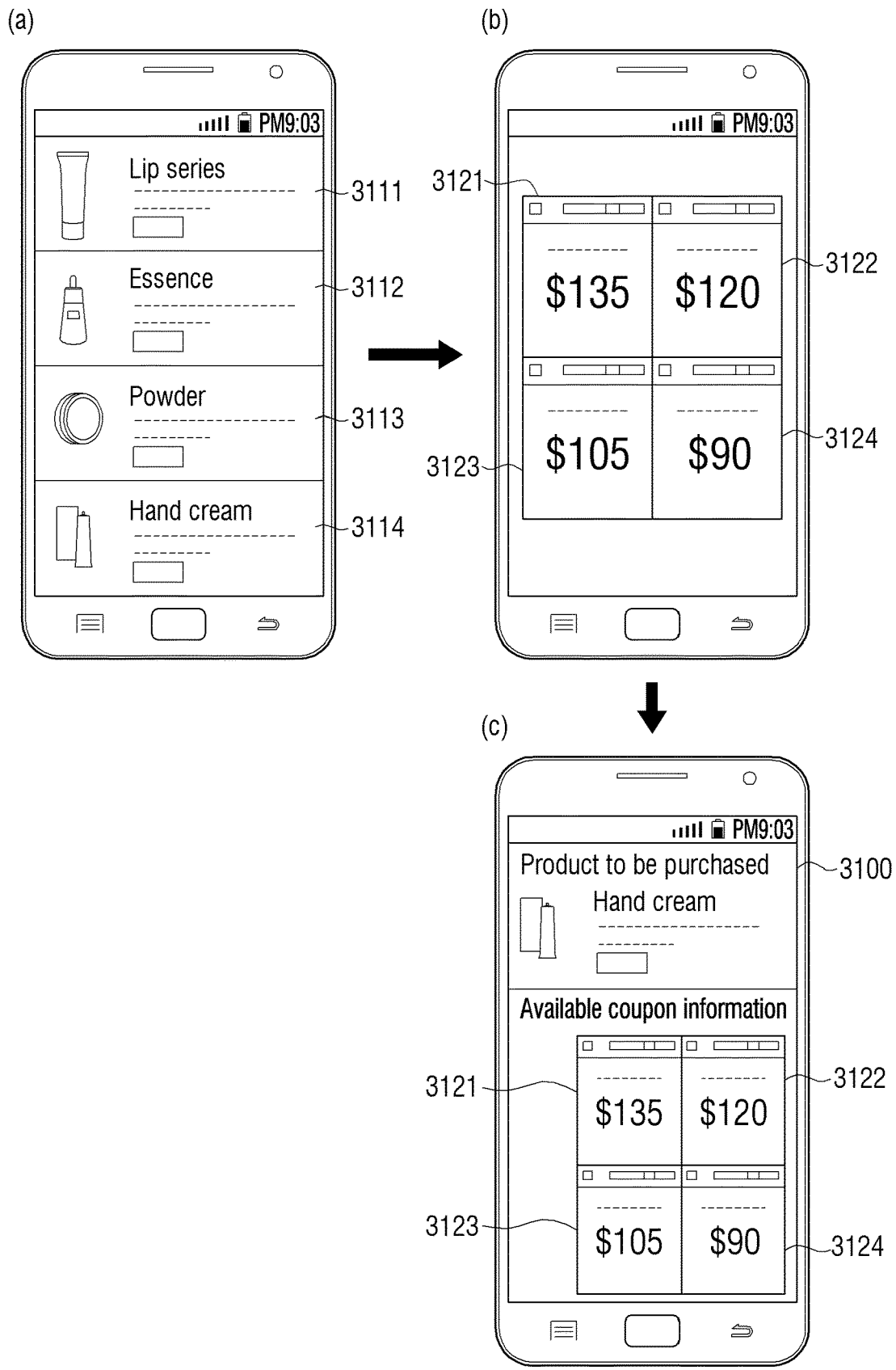
FIG. 31 is a diagram illustrating a method of searching additional service information based on purchasing record according to an exemplary embodiment.

FIG. 31 is a diagram illustrating a method of searching and displaying additional service information in the user terminal device according to another exemplary embodiment. Referring to (a) of FIG. 31, the user terminal device may store purchasing record of a user internally or display purchasing record on the screen by being provided from external servers. On the screen, information of purchased products 3111~3114 are marked. The user terminal device may extract common items included in each of the product information 3111~3114 and use for searching additional service information.

For example, if a user frequently purchased products from specific shopping mall, the user terminal device accesses the server which manages the shopping mall and receives coupon information or event information issued by the shopping mall. The user terminal device displays additional information 3121~3124 received from the server as illustrated in (b) of FIG. 31. The received additional service information 3121~3124 may be stored within the storage of the user terminal device.

In this situation, if a user tries to do shopping again, shopping screen 3100 may mark the stored additional service information 3121~3124 together as illustrated in (c) of FIG. 31. Thus, a user can purchase on more economical and interesting conditions by using the additional service information.

Therefore, the shopping system including the user terminal device, the host, and the server may properly provide additional services for a user. Further, according to another exemplary embodiment, user's shopping can be properly managed by using his purchasing records. The following will specifically explain another exemplary embodiment of using the purchasing records.

Figure 32:
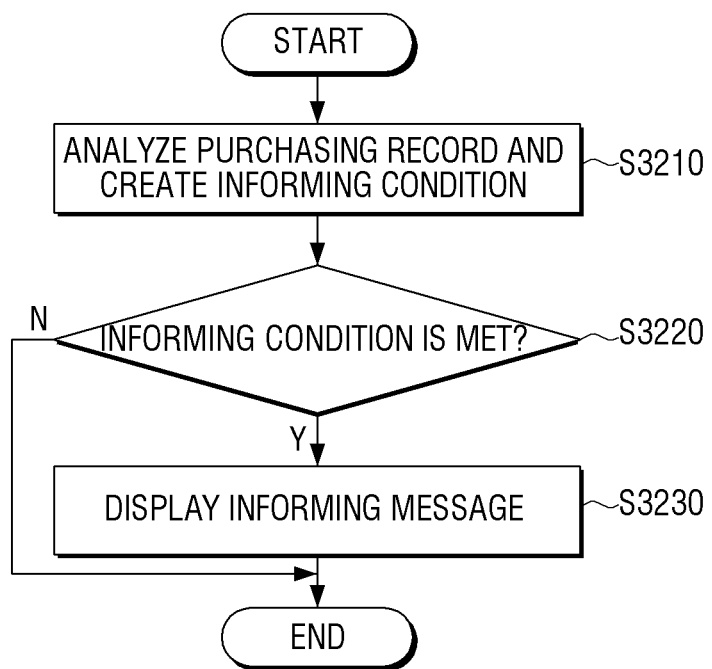
FIG. 32 is a flowchart illustrating a method of providing information based on a purchasing record in the user terminal device according to an exemplary embodiment.

FIG. 32 is a flowchart illustrating a method of providing shopping service in the user terminal device according to another exemplary embodiment. The user terminal device performing the method of FIG. 32 may be implemented as uniform composition of the user terminal device described in FIG. 6 or FIG. 15. Further, unillustrated units may be added or some units may be modified. For convenient explanation, the following will explain the exemplary embodiment by assuming that the user terminal device has the same composition as that of FIG. 6.

Referring to FIG. 32, the controller 130 of the user terminal device analyzes the purchasing records and creates informing condition at S3210. The purchasing records may be stored in the storage 140 of the user terminal device 100, or provided from the host, the payment server, or other external devices. The purchasing records may include name, type, price of a buying product, purchasing place, and purchasing date. Informing condition may be created according to various standards such as time, place, and activity. The user terminal device stores the created informing condition.

At S3220, the controller 130 determines whether to meet the informing condition. If the informing condition is met, the controller 130 may output and inform the informing message to a user at S3230. The informing message may be implemented as visual message which is displayed on the screen of the display 110, or audio message which is outputted through a speaker (not illustrated). Further, the informing message may not be limited to simple text message; the informing message using multimedia contents such as still image or video may be provided.

Figure 33:
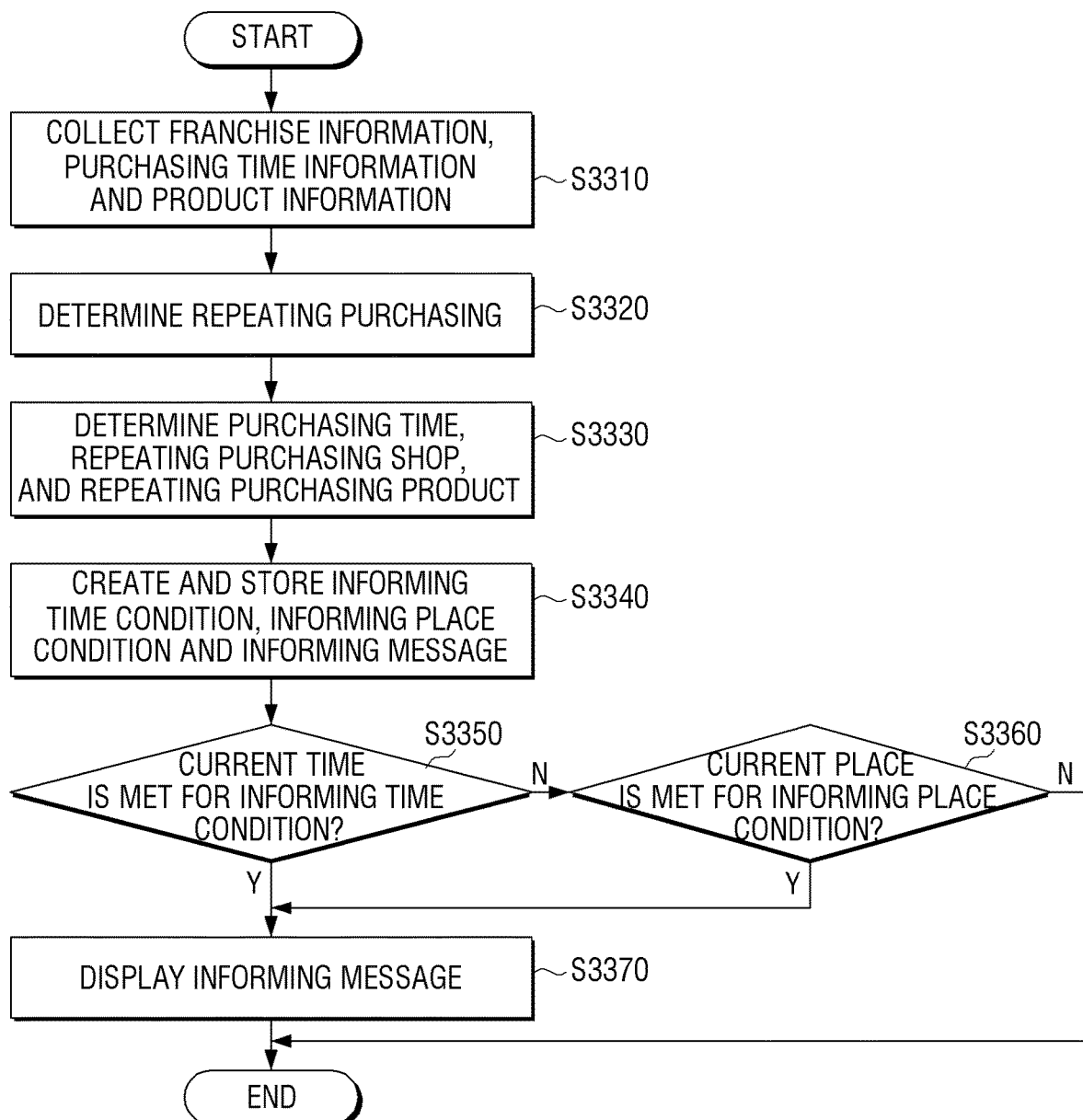
FIG. 33 is a flowchart specifically illustrating the method of FIG. 32 according to an exemplary embodiment.

FIG. 33 is a flowchart illustrating a method of providing shopping service more specifically. Referring to FIG. 33, the controller 130 collects franchise information, purchasing time information and product information from the purchasing records at S3310. At S3320, the controller 130 determines whether there is repeating purchasing activity by comparing the information. For example, if the purchasing records read that the same product or same category of products is purchased more than twice or various products are purchased more than twice from the same shopping mall, the controller 130 may determine that there is repeating purchasing activity.

If repeating purchasing activity is determined to occur, the controller 130 determines purchasing date, repeating purchasing shopping mall, and repeating purchasing product at S3330. The controller 130 creates and stores informing time condition, informing place condition and informing message in the storage 140 based on the determined information.

The informing date condition may include year-month-day condition indicating purchasing date, time condition, or purchasing period condition. For example, if purchasing is performed in 20th day of every month, the informing date condition may be established as 20th day of every month. If purchasing is performed on two week basis, the purchasing period condition may be established as that purchasing time approaches per two weeks based on the latest purchasing date. Further, if the purchasing time is limited to specific time period such as evening time, the evening time may be established as informing time condition.

If the condition is established based on shopping mall place, when purchasing is performed repeatedly at ZZZ mart, the informing place condition may be established to be within a meter radius based on the place of ZZZ mart.

Further, if CCC product is determined to be purchased repeatedly, texts informing the situation that CCC product needs to be purchased may be created as informing message.

While the above various informing conditions are created and stored, the controller 130 monitors whether to meet the informing condition by using time information and position information of the user terminal device. Time information may be received by using mobile communication network from a station which manages local area where the user terminal device moves, or may be directly counted by using a timer (not illustrated) mounted within the user terminal device 100. Position information may be directly calculated by using a global positioning system (GPS) chip (not illustrated).

When current time is determined to meet the informing time condition at S3350, or when current position is determined to meet the informing place condition at S3360, the controller 130 displays the stored informing message at S3370. According to the exemplary embodiment, the user terminal device may determine purchasing pattern of a user based on the purchasing records and provide suitable informing service.

Figure 34:
FIGS. 34 to 36 illustrate various examples of an informing message according to an exemplary embodiment.

FIG. 34 illustrates an example of informing message according to an exemplary embodiment. Informing message 3400 illustrated in FIG. 34 is an example of the message displayed if the informing period condition is met. The informing message may be displayed on the day of purchasing time; however, the informing message may be displayed before or after certain days based on the purchasing time for reminding so that a user does not forget to purchase basic goods. Although FIG. 34 illustrates that the informing message 3400 includes date information as well as previous buying product information, the date information may be deleted in cases.

Figure 35:
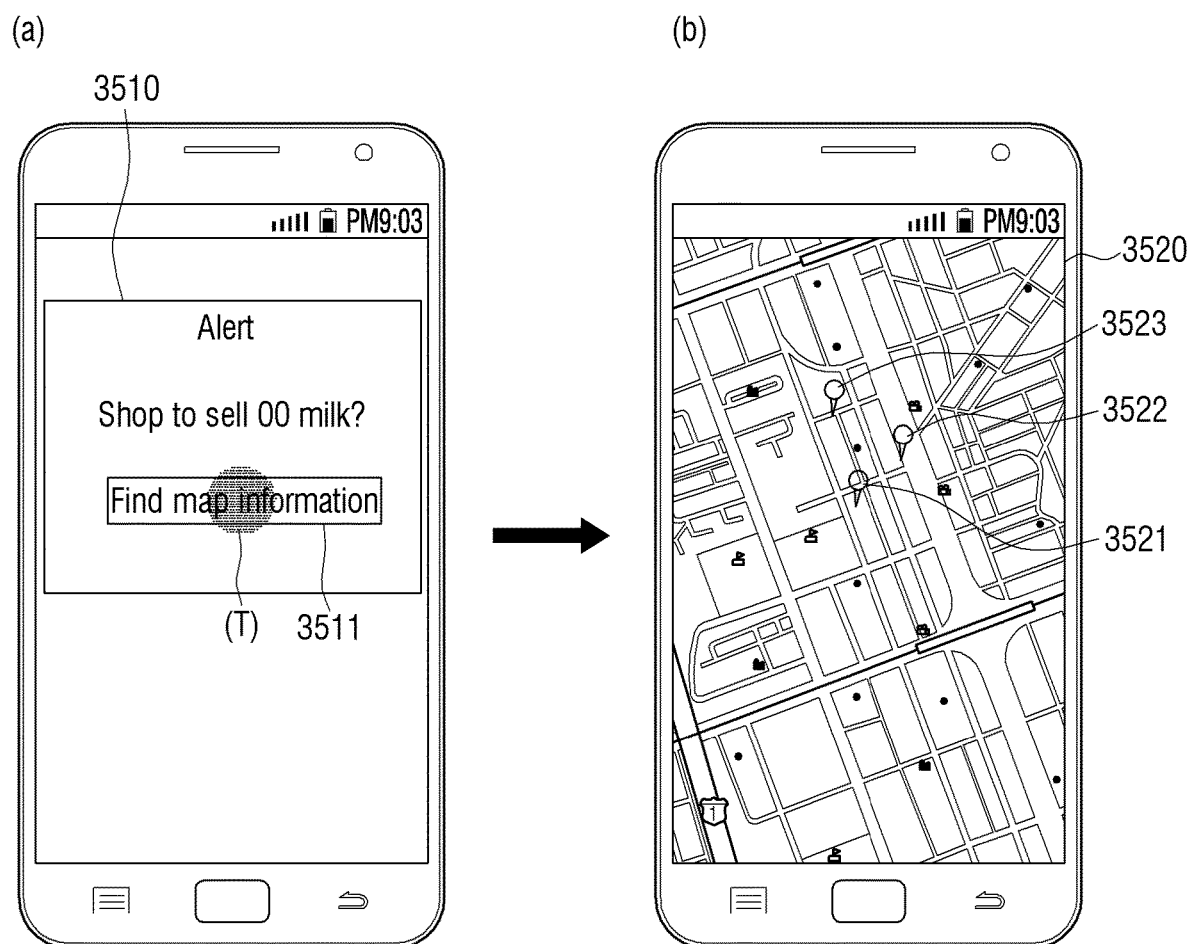

FIG. 35 illustrates another example of informing message. The informing message of FIG. 35 is an example of the message displayed if the informing place condition is met. When position of the user terminal device meets the informing place condition, in other words, when the user terminal device moves within determined radius based on the repeating purchasing place, the controller 130 may display the informing message.

Referring to (a) of FIG. 35, informing message 3210 may be constituted with message which notices specific product, and includes menu 3511 such as find map information. When a user touches the menu 3511, the controller 130 displays map 3520 provided from the storage 140 or the external server, as illustrated in (b) of FIG. 35. On the map 3520, icons 3521~3523 indicating places of shopping malls that sell corresponding product may be marked together. When a user selects each icon, various operation may be performed according to exemplary embodiments. For example, when one icon is selected, detailed information regarding the shopping mall corresponding to the selected icon or home page screen managed by the shopping mall may be automatically displayed. Further, road view or expanded map regarding the point directed by the selected icon may be displayed.

Figure 36:
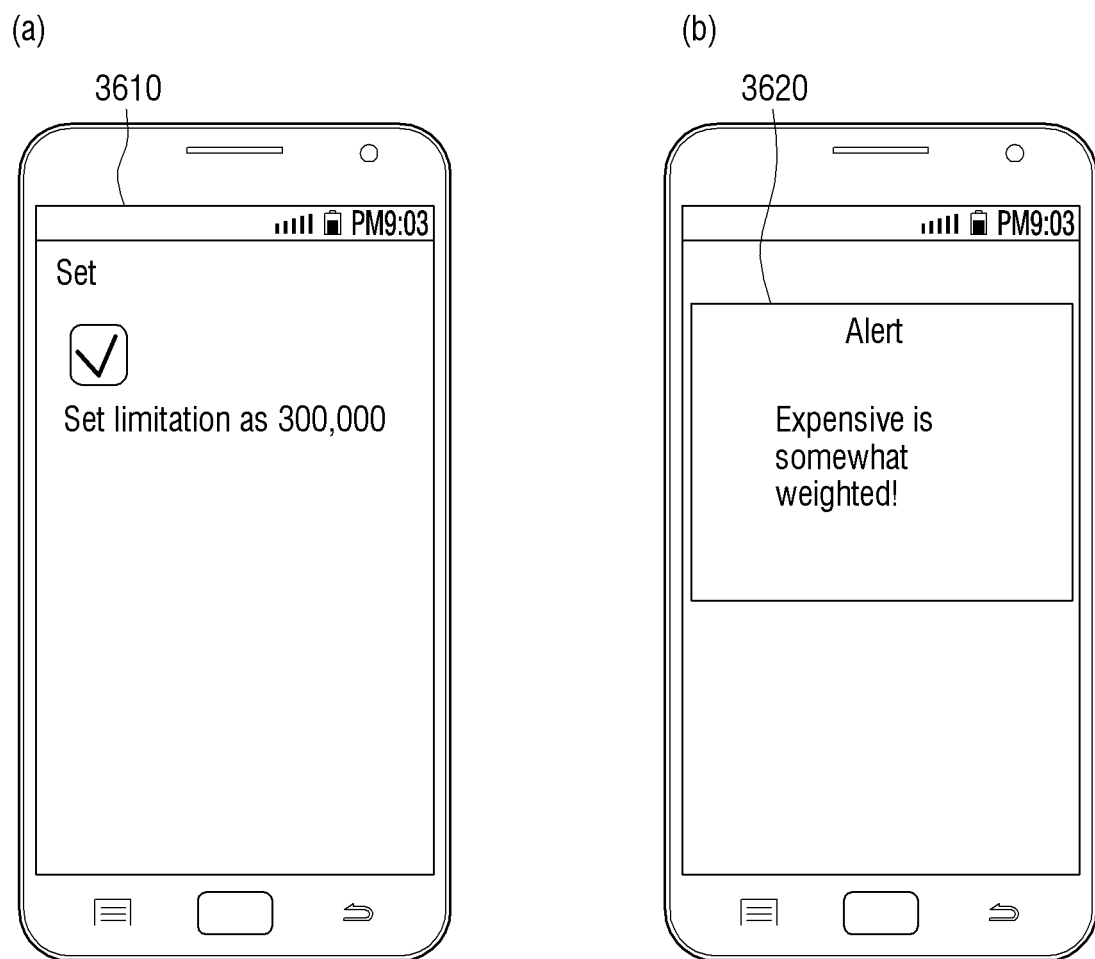

FIG. 36 illustrates screen provided according to another exemplary embodiment. Referring to FIG. 36, the user terminal device may inform financial information of a user. For example, a user may establish limit in using payment in the user terminal device. Specifically, the controller 130 displays setting screen which limit in using payment can be established according to implementing specific application. When a user establishes limit in using payment on the setting screen, the controller 130 stores the established limit on the storage 140. The limit in using payment may be stored in the server voluntarily or by user request other than the user terminal device.

Referring to (a) of FIG. 36, a composition of setting a screen where limit in using payment is established is illustrated. When the limit is established as illustrated in (a) of FIG. 36, the controller 130 monitors paid prices within the purchasing records and confirms the accumulated amount. If the accumulated amount is close to or more than the limit, the controller 130 may display informing message 3620 as illustrated in (b) of FIG. 36.

Although FIG. 36 illustrates an exemplary embodiment of preparing the situation that the used amount is more than the limit by providing the informing message, various methods may be used for the preparing according to exemplary embodiments. For example, when the used amount exceeds the limit, a user may limit using shopping service with the user terminal device for a determined time by inactivating the payment application such as wallet. Such limit policy may be stored in the storage 140 of the user terminal device and managed by the controller 130; however, the external server may manage the policy.

According to the above exemplary embodiments, proper information can be provided by analyzing purchasing pattern of a user. The efficiency in using shopping service is enhanced and convenience is heightened.

Meanwhile, the exemplary embodiments may be implemented by interlocking with the wish list described above. When there is a registered product on the wish list, the controller 130 may monitor whether current time information and position information correspond to the registered information on the wish list. Therefore, when corresponding information is confirmed, the controller 130 may display informing message regarding the product. Thus, when a user selects the informing message, the payment application such as wallet may automatically implement and the above mobile payment can be performed. As a result, selecting product and paying can be performed simply by using the purchasing wish list as well as the purchasing pattern of a user.

Besides, according to another exemplary embodiment, the user terminal device may manage the purchasing records more conveniently by using information obtained separately from purchasing product. The following will specifically describe operation of the user terminal device according to an exemplary embodiment.

Figure 37:
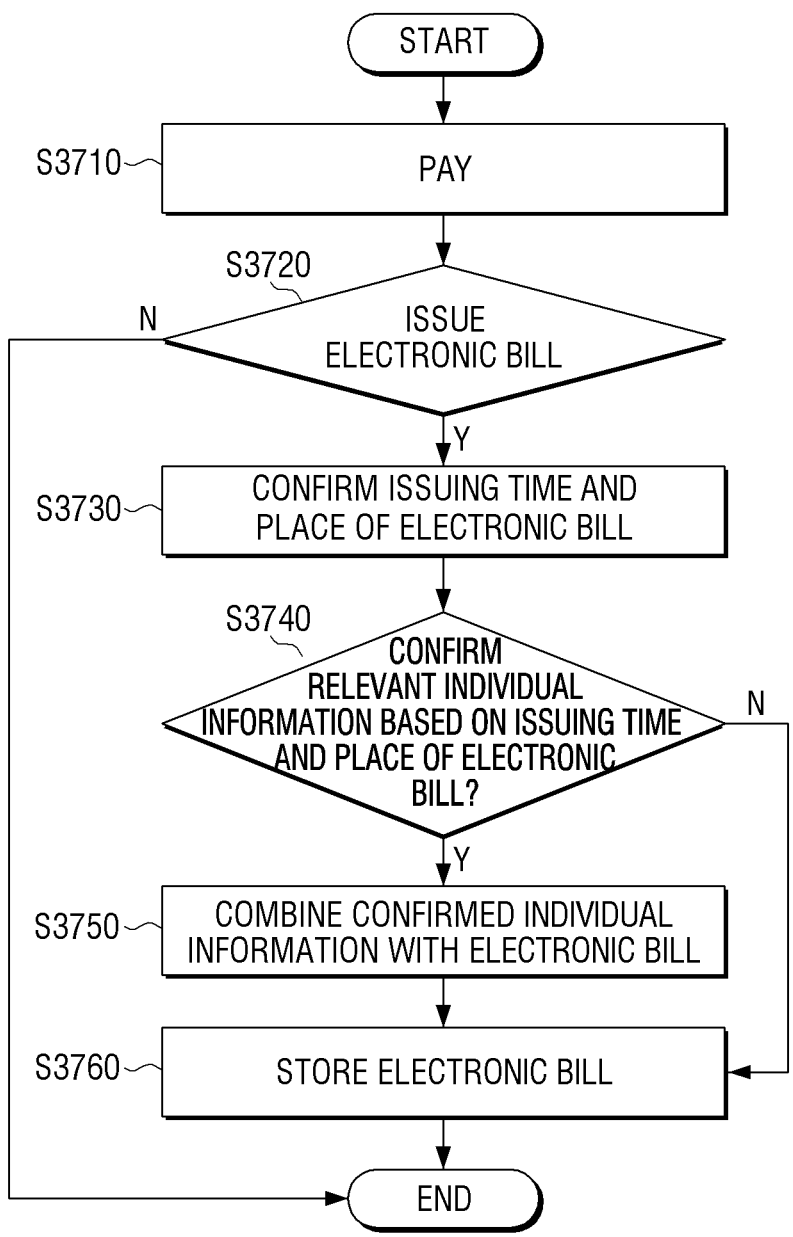
FIG. 37 is a flowchart illustrating a method of generating an electronic receipt at the user terminal device according to an exemplary embodiment.

FIG. 37 is a flowchart explaining a method of managing information in the user terminal device according to another exemplary embodiment. Referring to FIG. 37, when payment completes at S3710, the user terminal device 100 may receive an electronic receipt from the host 500 at S3720.

When the electronic receipt is issued, the controller 130 confirms the issuing time and issuing place at S3730.

The controller 130 confirms individual information related with purchasing based on the issuing time and place of the electronic receipt at S3740. Individual information may be various information such as photographed picture in the user terminal device, memo message, schedule, position information, accessed web site address, call log, trans-received mail or text message, messenger text, and type of the implemented application. The controller 130 may determine photographed pictures or extra individual information within a preset time based on the issuing time of the electronic receipt (e.g., one hour before and after issuing) as individual information related with purchasing, or photographed pictures or extra individual information within a preset position range based on the issuing place of the electronic receipt (e.g., 1 km radius from the issuing place) as individual information related with purchasing.

The controller 130 combines the confirmed individual information with the electronic receipt at S3750 and stores the combined information at S3760. Therefore, the customized electronic receipt may be stored for a user. A user can view the combined individual information when confirming the stored electronic receipt. Thus, he can easily remember his consumption. Therefore, possibility of using the electronic receipt may be enhanced.

Figure 38:
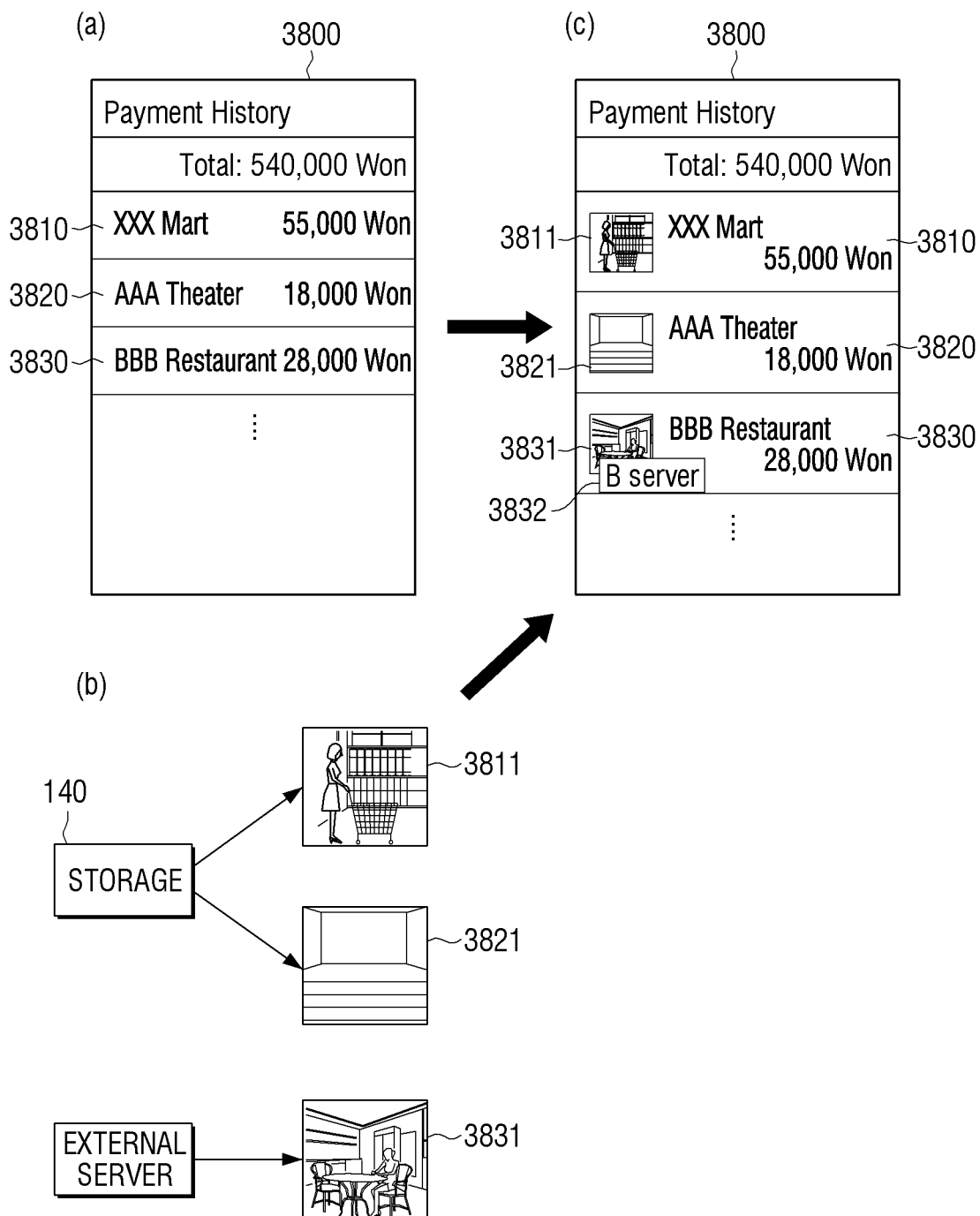
FIG. 38 is a diagram illustrating the electronic receipt generated by the method of FIG. 37 according to an exemplary embodiment.

FIG. 38 is a diagram explaining a process of generating an electronic receipt combined with individual information. Referring to (a) of FIG. 38, an electronic receipt is illustrated. Within an electronic receipt 3800, total paid price and purchased items 3810, 3820, 3830 may be marked.

The controller 130 searches contents to be combined with the electronic receipt from the storage 140 or the external server. Referring to (b) of FIG. 38, an example of searched contents is illustrated. In (b) of FIG. 38, picture contents 3811, 3821 are searched from the storage 140 and text contents 3831 is searched from the external server. The external server may be implemented variously such as SNS server, cloud server or web server. Further, contents registered by friends of a user may be included for searching as well as contents registered by a user of the user terminal device.

The controller 130 creates the electronic receipt 3800 modified as in (c) of FIG. 38 by respectively combining the electronic receipt and the searched contents. Each of the product items 3810, 3820, 3830 on the electronic receipt 3800 may mark the searched pictures 3811, 3821 or the texts 3831. Meanwhile, as illustrated in (c) of FIG. 38, regarding the contents 3831 searched from the external server, icon 3832 indicating contents source may be marked together.

As described above, because contents generated on similar time and place based on the time and place of issuing the electronic receipt can be provided with the electronic receipt, a user can remember the purchasing records more easily.

Figure 39:
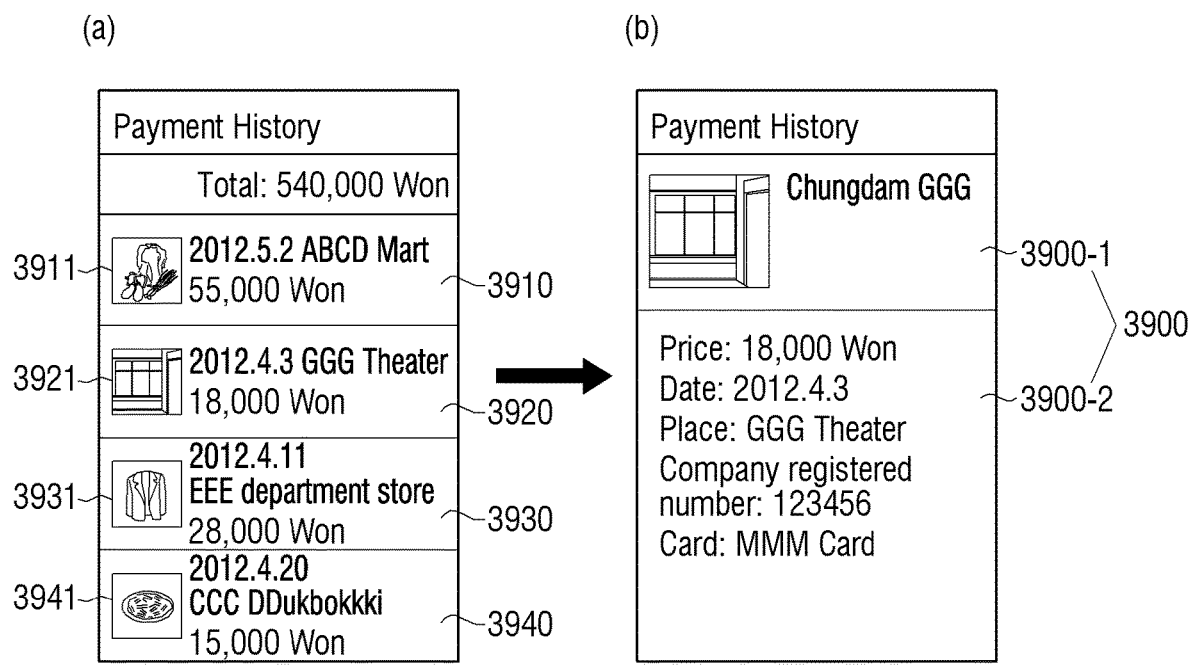
FIG. 39 illustrates a screen of detailed information regarding the electronic receipt according to an exemplary embodiment.

FIG. 39 is a diagram explaining a method of using an electronic receipt generated by the method of FIG. 38. Referring to (a) of FIG. 39, an electronic receipt including purchasing records 3910, 3920, 3930, 3940 respectively added with contents 3911, 3921, 3931, 3941 corresponding to the purchased products is illustrated. When a user selects (T) one purchasing record 3920, the controller 130 displays detailed guide screen 3900 regarding the selected purchasing record 3920. The detailed guide screen 3900 may be divided into contents area 3900-1 and information marking area 3900-2. Thus, a user can manage the electronic receipt easily.

Therefore, various exemplary embodiments may be implemented in overall processes of shopping service. The following will specifically explain comprehensive composition of the user terminal device to implement the above various exemplary embodiments.

Figure 40:
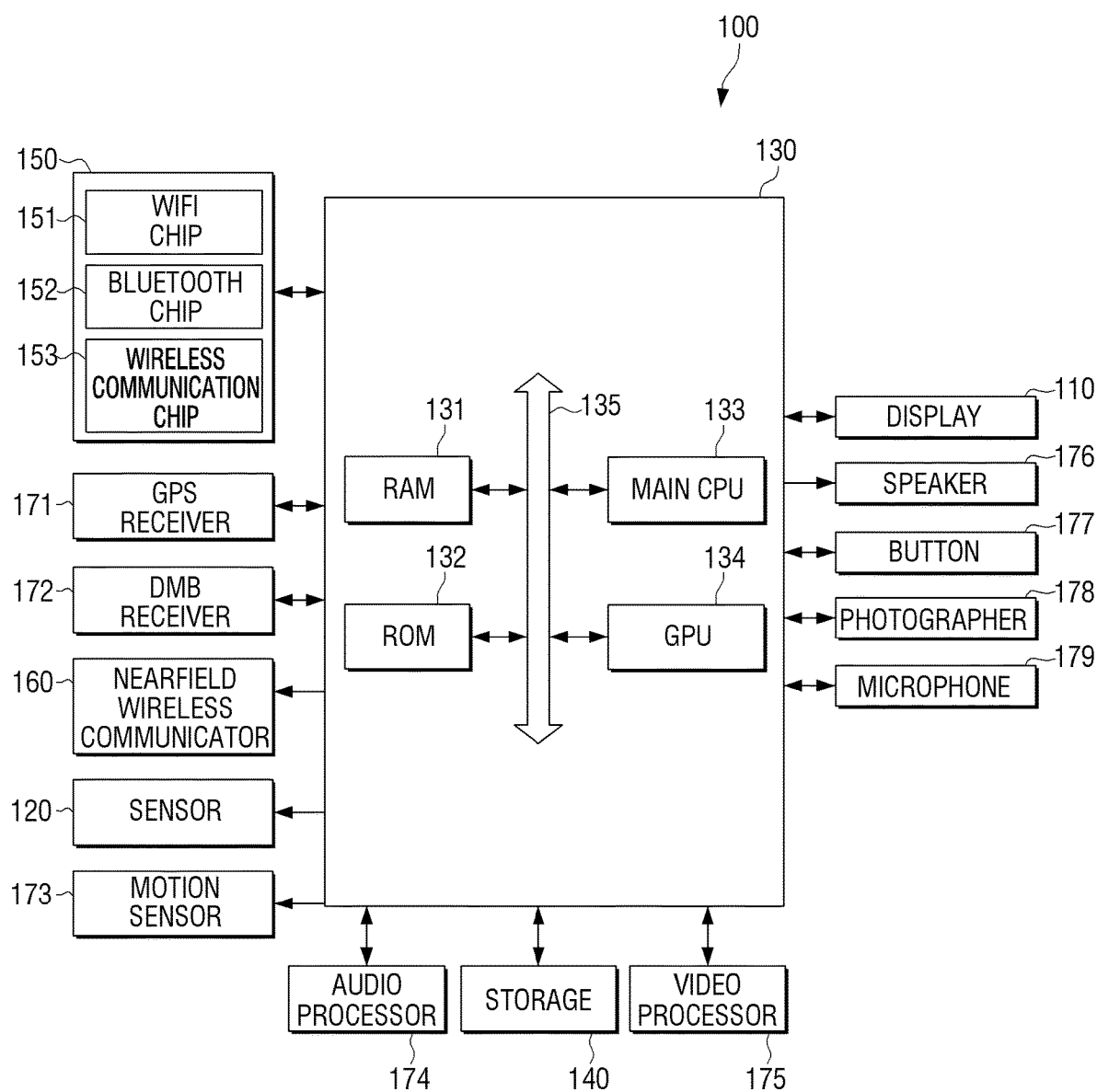
FIG. 40 is a block diagram illustrating a composition of a user terminal device according to one or more exemplary embodiments.

FIG. 40 is a block diagram comprehensively illustrating composition of the user terminal device according to various exemplary embodiments.

Referring to FIG. 40, the user terminal device 100 includes GPS receiver 171, a digital multimedia broadcasting (DMB) receiver 172, a motion sensor 173, an audio processor 174, a video processor 175, a speaker 176, a button 177, a camera 178, and a microphone 179 as well as the display 110, the sensor 120, the controller 130, the storage 140, the communicator 150 and the nearfield wireless communicator 160.

The controller 130 may generally manage operation of the user terminal device by using programs stored in the storage 140. Specifically, as described in the above various exemplary embodiments, the controller 130 may perform various operation such as operation to display shopping screen for selecting a product, operation to create wish list, operation to perform processing of product payment, operation to provide informing message based on the wish list, operation to provide informing message based on the purchasing records, and operation to create and manage an electronic receipt.

The controller 130 may include RAM 131, ROM 132, main CPU 133, a graphic processing unit (GPU) 134, and a bus 135. RAM 131, ROM 132, the main CPU 133 and GPU 134 can be connected with each other through the bus 135. Further, sorts of interfaces may be included; this will not be illustrated and described herein.

The main CPU 133 accesses to the storage 140 and performs booting by using the stored O/S. ROM 132 stores a set of commands for booting the system. When a command to turn on is inputted and electrical power is provided, the main CPU 133 copies the stored O/S in the storage 140 to RAM 131 according to the stored commands in ROM 132, and boots the system by implementing O/S. When booting completes, the main CPU 133 copies sorts of programs stored in the storage 140 to RAM 131, and performs sorts of operation by implementing the copied programs in RAM 131. When there are applications established as default, the main CPU 133 may automatically implement the programs after completing the booting. Further, as described above, when a user takes specific gestures on sorts of screen including shopping screen or selects coupon information, the payment application such as wallet may be automatically implemented.

GPU 134 may create background screen, icon display screen, unlock screen and extra screen according to controlling of the main CPU 133. Specifically, when web browser implements and web site screen data is received from the web server, GPU 134 may render the web page screen on the display 110 by using the received data. Further, when the payment application such as wallet implements, list screen regarding the payment tools may be rendered based on information regarding sorts of the payment tools stored in the storage 140. In summary, GPU 134 may render the screen illustrated in the above various exemplary embodiments.

The communicator 150 is unit which performs communication with various types of external devices according to various types of communication methods. The communicator 150 includes WiFi chip 151, Bluetooth chip 152 and wireless communication chip 153. The wireless communication chip 153 indicates chip which performs communication according to various communication protocols such as IEEE, Zigbee, 3rd Generation (3G), 3rd Generation Partnership Project (3GPP), and Long Term Evolution (LTE). The communicator 150 mounts at least one of the chips described above or chips according to other communication protocols, and may communicate with various external devices by using the chips.

The nearfield wireless communicator 160 performs communication with external devices according to nearfield wireless communication methods such as NFC and RFID. Composition and operation of the nearfield wireless communicator 160 are specifically described in the above descriptions regarding FIG. 15, which will not be further explained.

When a payment tool is selected on the payment screen, the controller 130 transmits information regarding the payment tool to external devices through the communicator 150 or the nearfield wireless communicator 160.

GPS receiver 171 receives GPS signals from GPS satellite, and calculates current position of the user terminal device 100. In the exemplary embodiments described in FIGS. 32 and 33 or in the exemplary embodiments described in FIG. 37, the controller 130 may use position information of the user terminal device. Position information may be calculated by the controller 130 based on the signals received from GPS receiver 171. According to exemplary embodiments, the controller 130 may transmit the calculated position information when communicating with the external devices.

DMB receiver 172 receives and processes DMB signals.

The sensor 120 senses touches on the surface of the display 110. The controller 130 may determine which object is selected by comparing coordinate values of objects within the displayed screen and the touch coordinate values of the sensor 120.

The motion sensor 173 senses motion such as rotating of the user terminal device 100 by using a gyro sensor, a geomagnetic sensor, and an acceleration sensor. The controller 130 may perform various controlling operation according to motion sensed by the motion sensor 173 as well as touch manipulation sensed by the sensor 120.

The audio processor 174 performs processing audio data included in contents. The audio processor 174 may perform various processing such as decoding, amplifying and noise filtering regarding the audio data.

The video processor 175 performs processing video data included in contents. The video processor 175 may perform various image processing such as decoding, scaling, noise filtering, frame rate converting and resolution converting regarding the video data.

The audio processor 174 and the video processor 175 may be driven when contents received from external sources or programs to play the stored contents in the storage 140 implement.

The display 110 may display image frame generated in the video processor 175 as well as sorts of screens rendered in GPU 134. Further, the speaker 176 outputs audio data generated in the audio processor 174.

The button 177 may be mounted within a body of the user terminal device 100 in various formats such as home button, push button, touch button and wheel button.

The camera 178 performs photographing. The controller 130 may select an image corresponding to the electronic receipt among the photographed images, add to the electronic receipt, and store in the storage 140.

The microphone 179 receives user voices or other sounds and converts to audio data. The controller 130 may use the user voices inputted through the microphone 179 while calling, or convert to audio data and store in the storage 140. Further, the controller 130 may perform searching information by recognizing voice inputting words inputted through the microphone 179 as searching words.

FIG. 40 comprehensively illustrates sorts of units that can be mounted in the user terminal device 100 when the user terminal device 100 comprehensively supports various functions such as communication, DMB and GPS receiving. Thus, according to exemplary embodiments, some of the units illustrated in FIG. 40 may be deleted or modified, and other units may be further added.

Figure 41:
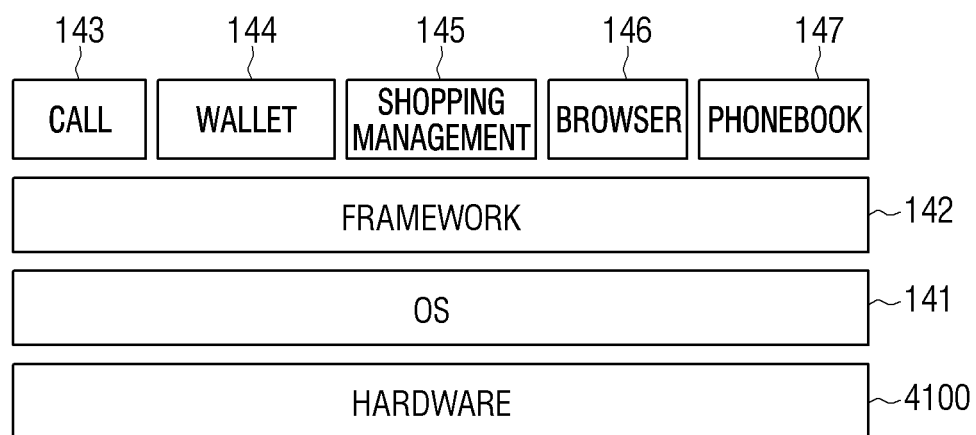
FIG. 41 illustrates an example of software architecture used in the user terminal device according to one or more exemplary embodiments.

FIG. 41 illustrates an example of software architecture that can be applied to the user terminal device. Referring to FIG. 41, the user terminal device 100 may include various software such as OS 141, framework 142, call application 143, wallet application 144, shopping managing application 145, browser 146, and phone book application 147 as well as hardware 4100.

The hardware 4100 indicates sorts of hardware illustrated in FIG. 40. OS 141 performs controlling and managing overall operation of the hardware 4100. OS 141 is class which manages basic functions of hardware management, memory and security. OS 141 may control operation of the user terminal device 100 by driving module such as display driver to drive the display 110, communication driver to trans-receive signals by activating the communicator 150, camera driver to drive the photographer 178, audio driver to drive the audio processor 174, and electrical power manager.

As upper layer of OS 141, the framework layer 142 is generated. The framework 142 performs a role of connecting OS class 141 with sorts of application programs 143~147. For example, the framework layer 142 includes location manager, notification manager and frame buffer which displays image on the display.

As upper layer of the framework layer 142, application layer is generated to implement various functions. Within the application layer, the wallet application 144 and the shopping managing application 145 are installed. The shopping managing application 145 indicates encoded program to perform various functions such as operation to create and manage the wish list as described above, operation to receive and edit the electronic receipt, and operation to manage the purchasing records. The wallet application 144 is encoded program to perform payment operation.

In summary, according to the various exemplary embodiments, shopping service can be provided more easily and conveniently by using the user terminal device.

The above methods of providing service according to the exemplary embodiment may be implemented as programs that can be performed through various computer tools, and may be recorded on computer readable recording medium.

Specifically, the user terminal device may mount non-transitory computer readable recording medium recording programs which provide shopping service by consecutively performing displaying the shopping screen, sensing the user manipulation performed on the shopping screen, extracting objects marked within area defined by the user manipulation on the shopping screen, creating wish list by classifying the extracted objects according to a plurality of classification items, displaying the wish list and providing shopping service by accessing a server corresponding to the selected product when a product is selected on the wish list.

Additionally, non-transitory computer readable recording medium recording programs which implement the methods of providing service in the host or the server according to the various exemplary embodiments may be mounted.

Non-transitory computer readable recording medium can be connected or mounted with various types of mobile devices as described above and support implementing the above methods in corresponding devices.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present teaching can be readily applied to other types of apparatuses.

Also, the description of the exemplary embodiments is intended to be illustrative, and not to limit the scope of the claims.

What is claimed is:

1. An electronic device, comprising:
a display;
a sensor; and
a controller configured to:
control the display to display a screen comprising information on a product;
receive a user input comprising a curve drawn by a user around the information on the product to define a closed area on the screen, the user input being sensed by the sensor,
detect a symbol indicating a monetary unit, the symbol being included in at least one object included in the closed area,
obtain price information of the product based on a number detected from the text displayed adjacent to the symbol; and
add the obtained price information to a wish list.

2. The electronic device of claim 1, wherein the controller is further configured to compare the obtained price information with previously stored price information in the wish list and update the wish list based on a result of the comparison.

3. The electronic device of claim 1, wherein the controller is further configured to:
based on the at least one object being an image, obtain an image of the product based on the image and add the image to the wish list, and
based on the at least one object being a text, obtain an original text regarding the product and add the original text to the wish list.

4. The electronic device of claim 1, further comprising:
a nearfield wireless communicator configured to receive a payment request for the product,
wherein the controller is further configured to, based on the payment request being received, identify prices for a same product registered in the wish list based on the price information and pay for the product with a lowest price among the prices in the wish list.

5. A method of providing shopping service in an electronic device, the method comprising:
displaying a screen comprising information on a product on a display;
receive a user input comprising a curve drawn by a user around the information on the product to define a closed area on the screen, the user input being sensed by a sensor;
detecting a symbol indicating a monetary unit, the symbol being included in at least one object included in the closed area;
obtain price information of the product based on a number detected from text displayed adjacent to the symbol; and
adding the obtained price information to a wish list.

6. The method of claim 5, further comprising:
comparing the obtained price information with previously stored price information in the wish list; and
updating the wish list based on a result of the comparison.

7. The method of claim 5, further comprising:
based on the at least one object being an image, obtaining an image of the product based on the image;
adding the image to the wish list;
based on the at least one object being a text, obtaining an original text regarding the product; and
adding the original text to the wish list.

8. The method of claim 5, further comprising:
receiving a payment request through a nearfield wireless communicator; and
based on the payment request being received, identifying prices for a same product registered in the wish list based on the price information; and
paying for the product with a lowest price among the prices in the wish list.

9. The electronic device of claim 1, wherein the symbol is a first symbol, the price information is first price information, the text is a first text, and the number is a first number, and
wherein the controller is further configured to:
detect a second symbol included in the at least one object;
identify second price information based on a second number detected from second text displayed adjacent to the second symbol;
identify a discount price and a discount rate based on a comparison between the first price information and the second price information; and
add the discount price and the discount rate to the wish list.

* * * * *